US010225610B2

(12) United States Patent
McCoy et al.

(10) Patent No.: US 10,225,610 B2
(45) Date of Patent: Mar. 5, 2019

(54) METHOD AND APPARATUS FOR CONTENT CHANNELS USING USER FEEDBACK

(75) Inventors: Charles McCoy, Coronado, CA (US); True Xiong, San Diego, CA (US); Ling Jun Wong, Champaign, IL (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 27 days.

(21) Appl. No.: 13/433,811

(22) Filed: Mar. 29, 2012

(65) Prior Publication Data

US 2013/0263006 A1    Oct. 3, 2013

(51) Int. Cl.
G06F 17/30      (2006.01)
G06F 3/0482     (2013.01)
H04N 21/458     (2011.01)
H04N 21/472     (2011.01)
H04N 21/482     (2011.01)

(52) U.S. Cl.
CPC ......... *H04N 21/458* (2013.01); *G06F 3/0482* (2013.01); *G06F 17/30743* (2013.01); *G06F 17/30772* (2013.01); *H04N 21/472* (2013.01); *H04N 21/4825* (2013.01)

(58) Field of Classification Search
CPC ............... H04N 21/458; H04N 21/472; H04N 21/4825; G06F 17/30772; G06F 17/30058; G06F 17/30743; G06F 17/30053; G06F 3/0482; H04L 2209/60
USPC ....................................................... 715/738
See application file for complete search history.

(56) References Cited

U.S. PATENT DOCUMENTS

| | | | | |
|---|---|---|---|---|
| 5,616,876 | A * | 4/1997 | Cluts | 84/609 |
| 7,024,424 | B1 * | 4/2006 | Platt et al. | |
| 7,970,664 | B2 * | 6/2011 | Linden et al. | 705/26.7 |
| 8,669,457 | B2 * | 3/2014 | Ringewald et al. | 84/615 |
| 8,887,200 | B2 * | 11/2014 | Cahnbley | H04H 60/65 725/39 |
| 2002/0082901 | A1 * | 6/2002 | Dunning | G06F 17/30017 705/26.63 |
| 2006/0212444 | A1 * | 9/2006 | Handman et al. | 707/5 |
| 2006/0278064 | A1 * | 12/2006 | Lourdeaux | G06F 17/30867 84/609 |
| 2008/0065638 | A1 * | 3/2008 | Brodersen et al. | 707/7 |
| 2008/0115168 | A1 * | 5/2008 | Adwankar et al. | 725/46 |
| 2008/0126418 | A1 * | 5/2008 | Vignoli et al. | 707/104.1 |

(Continued)

FOREIGN PATENT DOCUMENTS

| | | |
|---|---|---|
| CN | 1725854 A | 1/2006 |
| CN | 1988461 A | 6/2007 |
| CN | 101529437 A | 9/2009 |

OTHER PUBLICATIONS

Ehrlich, Pandora Adds "Genre" Option to Station Creation, Aug. 24, 2010.*

(Continued)

*Primary Examiner* — Nicholas Ulrich
(74) *Attorney, Agent, or Firm* — Haug Partners LLP; William S. Frommer

(57) ABSTRACT

An apparatus and method of generating a content channel that includes accessing a list of content assets, utilizing one or more content assets as settings for the content channel, and selecting additional content assets. The selection is based on the settings. The content channel is generated based on the additional content assets.

32 Claims, 20 Drawing Sheets

(56) References Cited

U.S. PATENT DOCUMENTS

| | | | |
|---|---|---|---|
| 2008/0208823 A1* | 8/2008 | Hicken | 707/3 |
| 2009/0240732 A1* | 9/2009 | Amidon | G11B 27/105 |
| 2010/0088327 A1* | 4/2010 | Holm et al. | 707/758 |
| 2010/0162115 A1 | 6/2010 | Ringewald et al. | |
| 2012/0023595 A1* | 1/2012 | Speare et al. | 726/28 |
| 2013/0170813 A1* | 7/2013 | Woods et al. | 386/200 |
| 2013/0191928 A1* | 7/2013 | Yin et al. | 726/27 |

OTHER PUBLICATIONS

Costello, Creating iTunes Playlists, Feb. 9, 2009.*
Kaltschnee, Netflix Launches Profiles: New Queue Sharing Feature, Jan. 7, 2005.*
Kirby, More on Pandora: genres, genomes, and musical taste . . . , Feb. 15, 2010.*
The Massage Toolbox, Getting the Most from a Pre-Made (Shared) Pandora Station, Dec. 10, 2016*
Shintani, A Program Guide Having a User Customized Channel With Content That Is Updated According to the User's Profile, Nov. 1, 2000, IP.com.*
Gupta, Method and System for IPTV Advertisement based on Content Delivery and User Preferences with Dynamic Pricing of Ads, Jun. 25, 2010, IP.com.*
Harbison, 20 Great Youtube Features and Tricks You Need to Know, Jun. 7, 2011, SimplyZesty.com.*
Chinese Office Action dated Dec. 10, 2015, with pending claims and English translation.

* cited by examiner

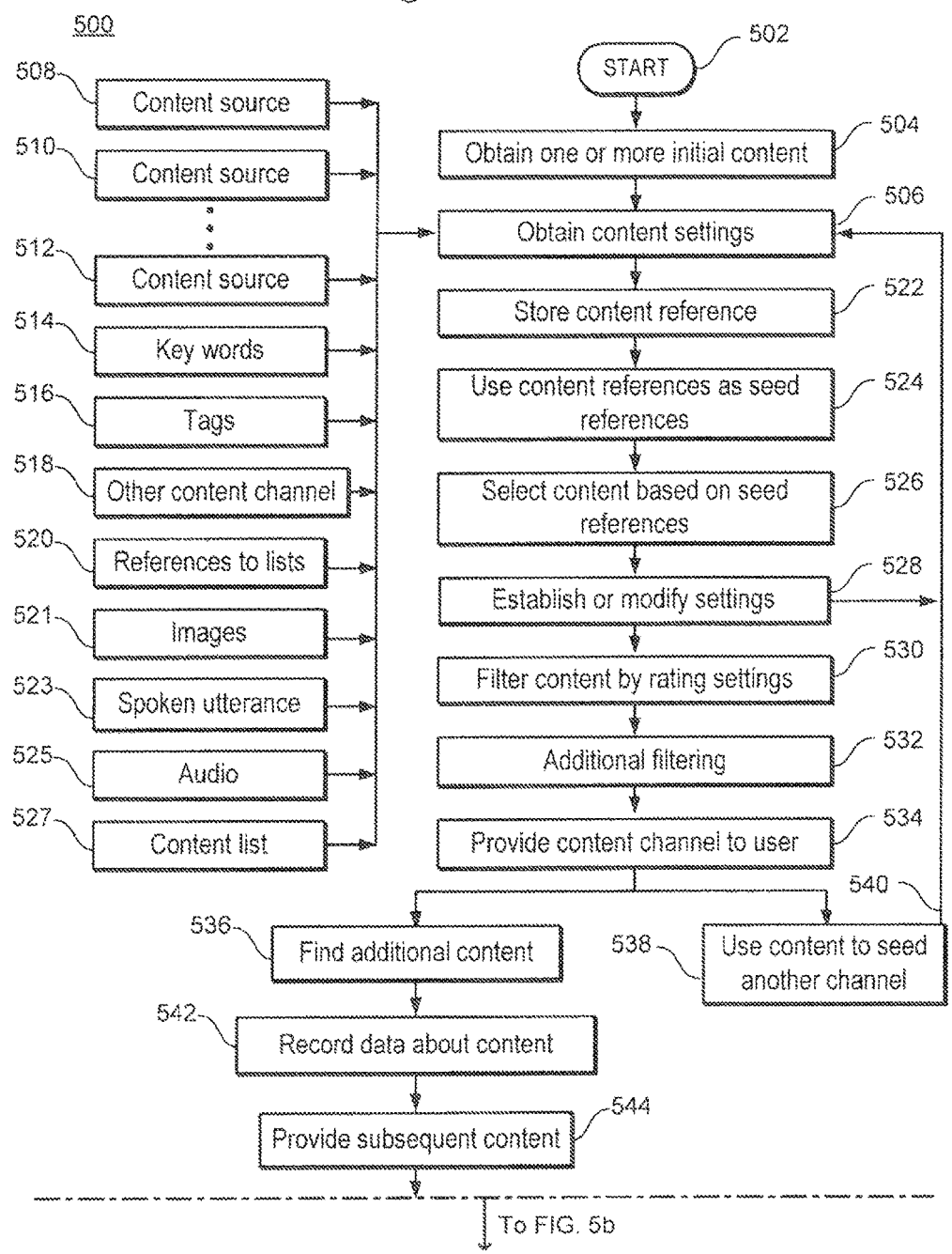

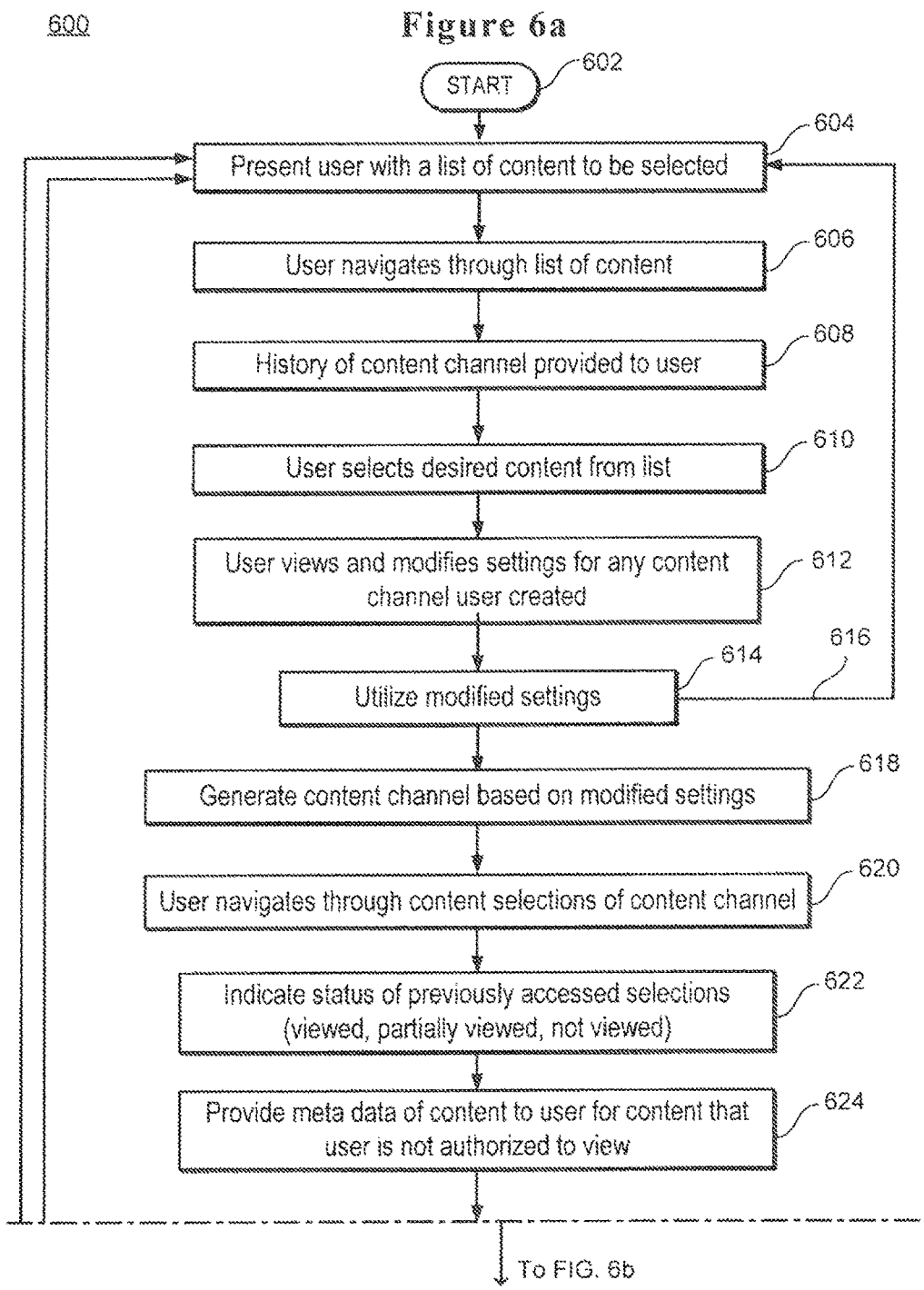

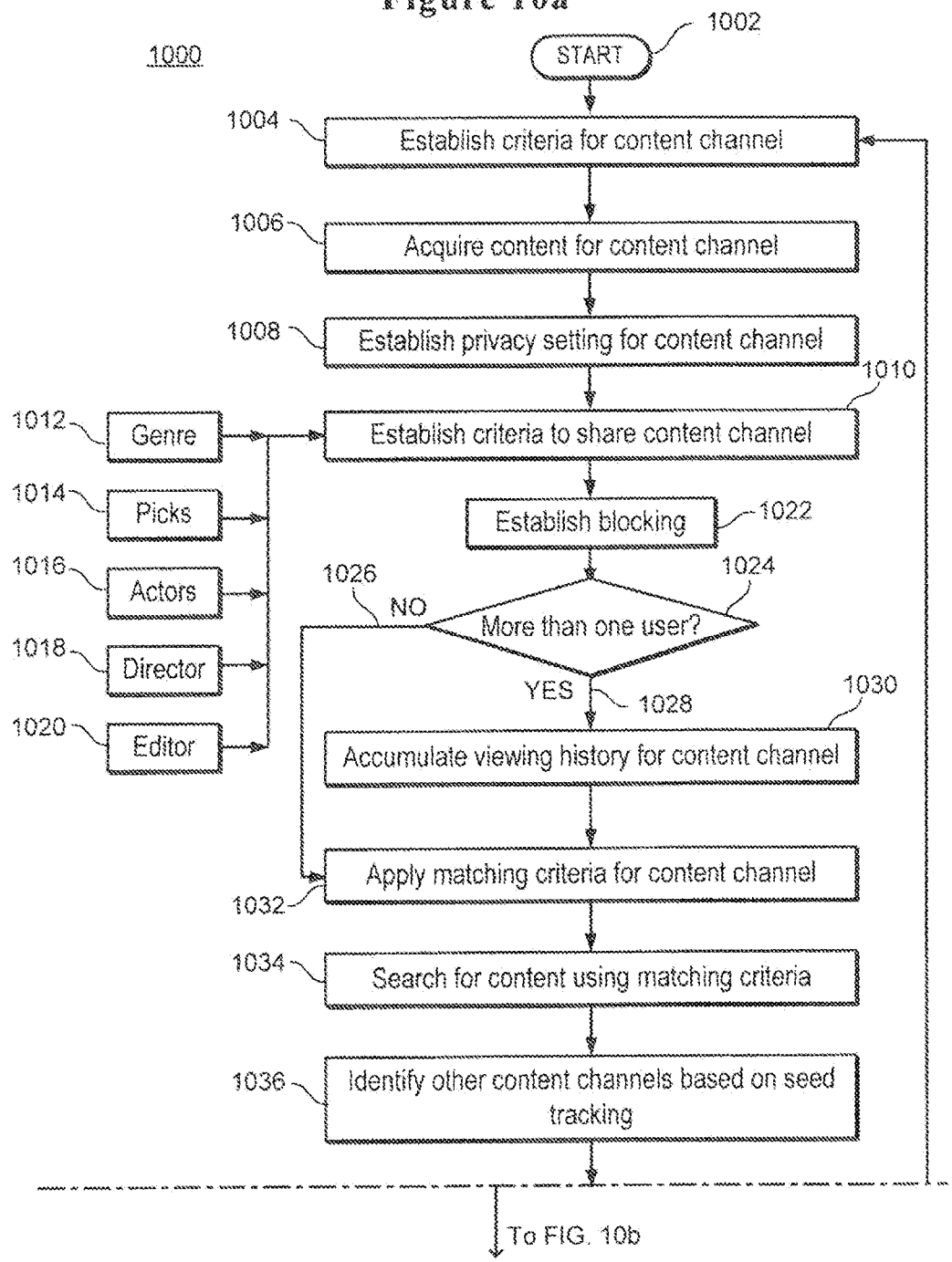

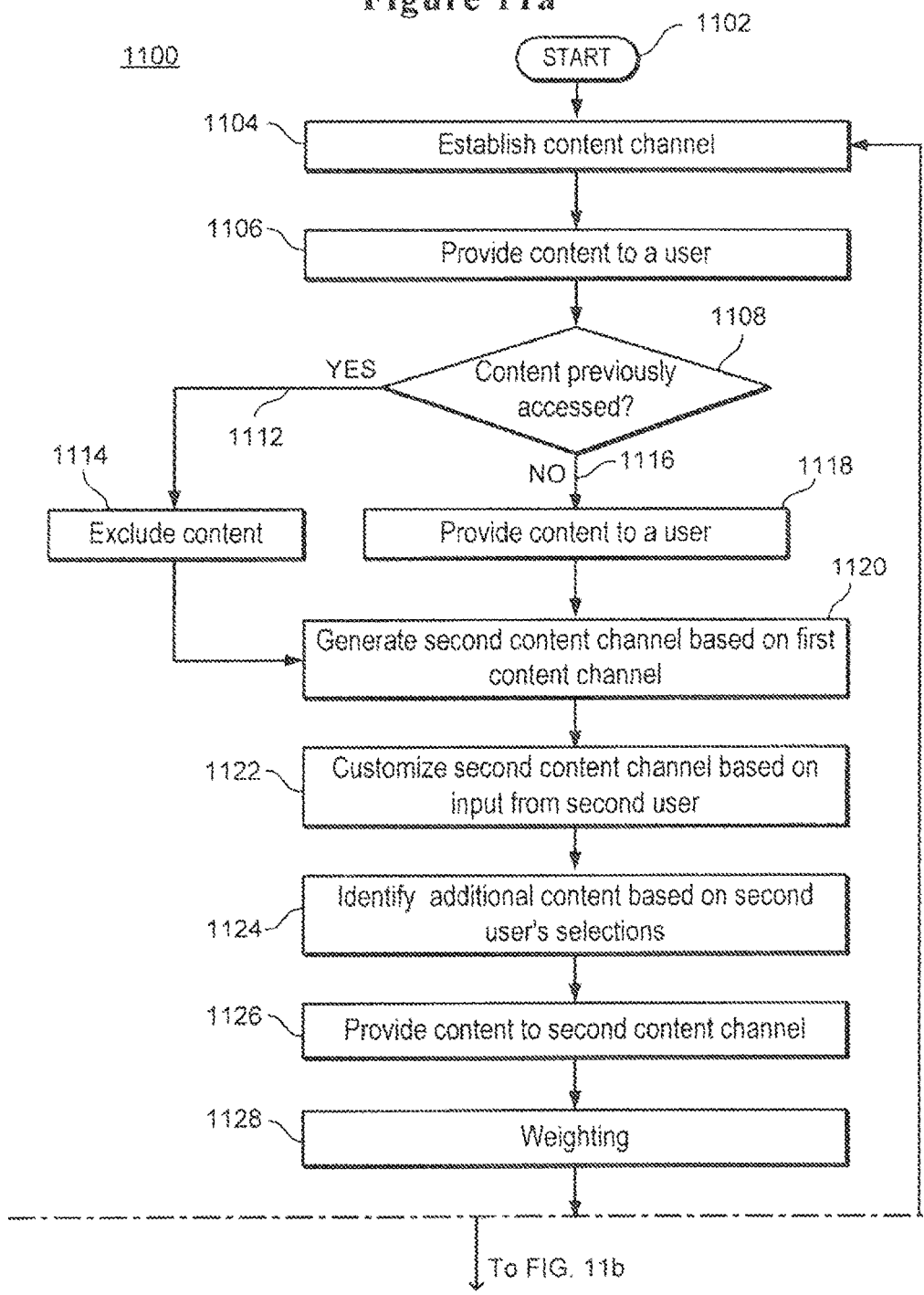

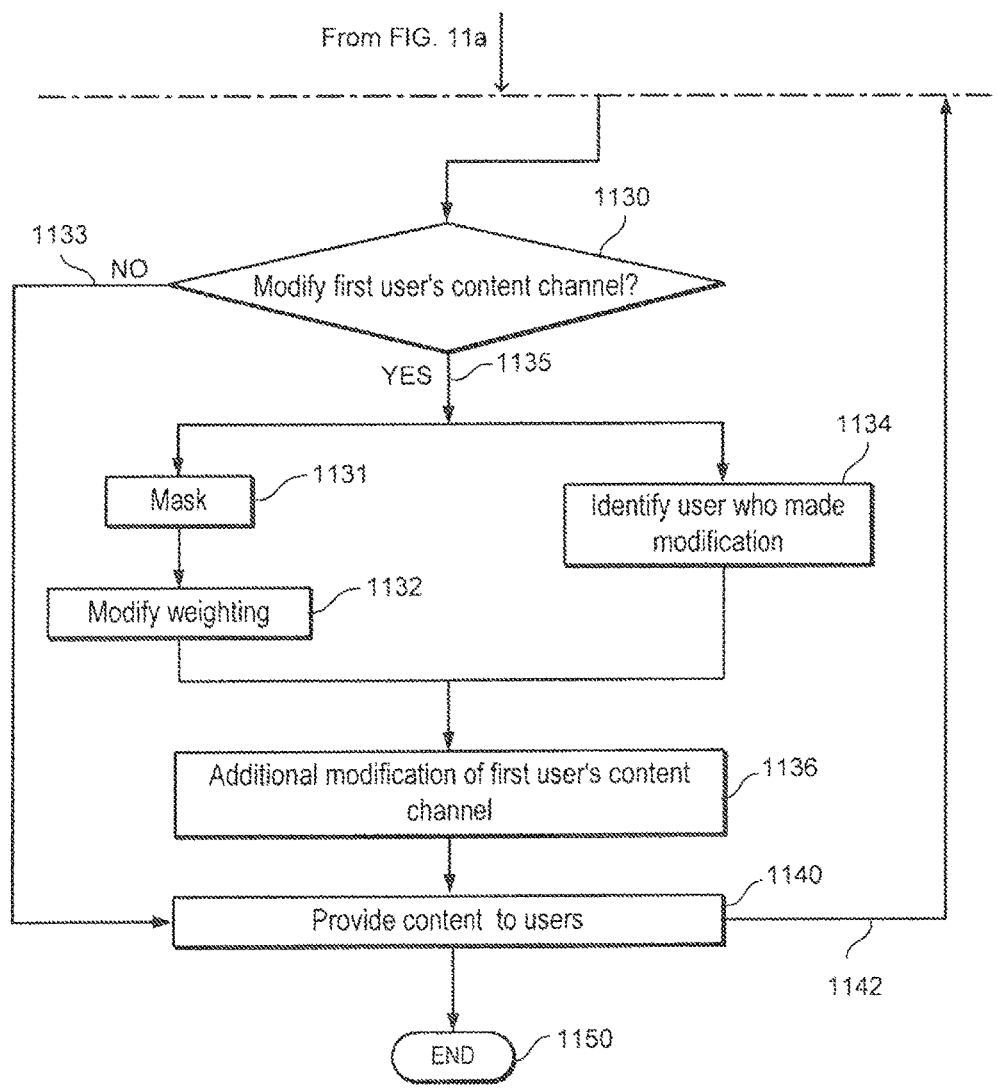

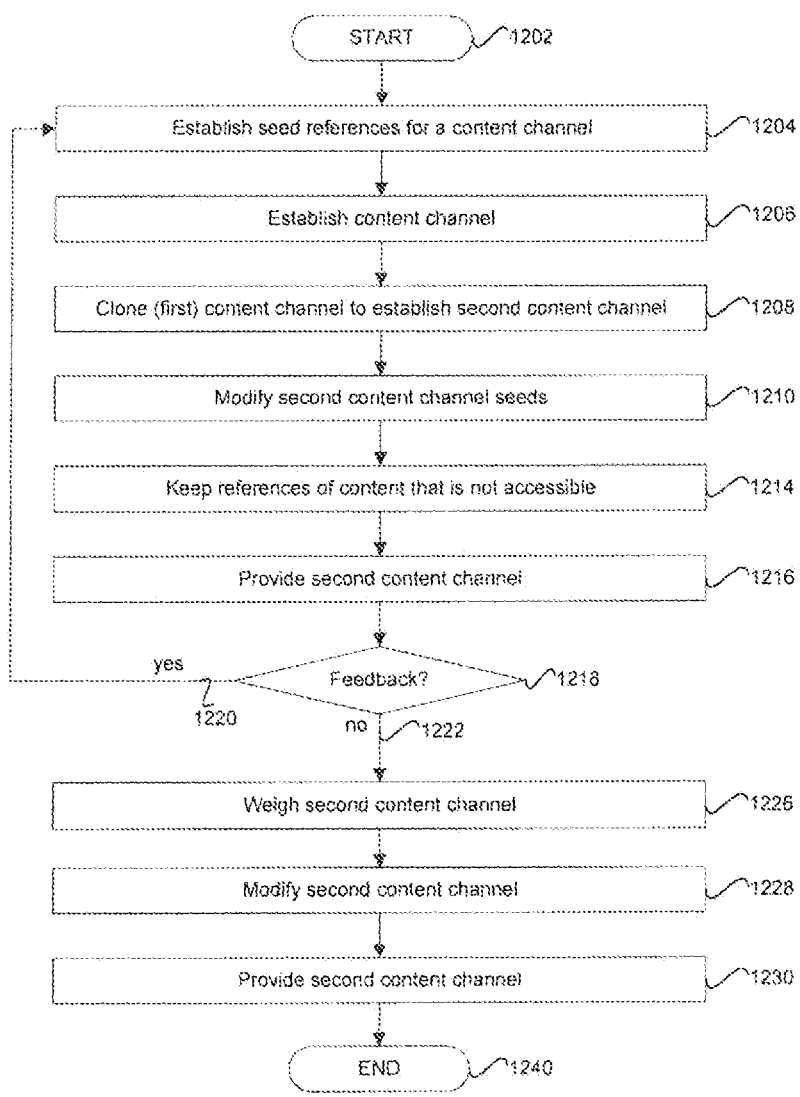

METHOD AND APPARATUS FOR CONTENT CHANNELS USING USER FEEDBACK

BACKGROUND

1. Field of the Invention

This invention relates generally to a system and method of creating channels dedicated to particular types of desired content, thereby allowing a user a passive viewing experience.

2. Background Discussion

Generally, in broadcast television, there are channels dedicated to particular types of content, such as ESPN for sports. The content shown is consistent and predictably dedicated to such content. Additionally, online viewing websites, such as YOUTUBE™, allow users to create channels by selecting specific content, and suggest other specific content based on the user's viewing history. However, neither of the above media creates channels consistently and predictably dedicated to particular content.

SUMMARY

Content channels provide a very flexible way to help users find content of interest to them in the vast array of selections available from multiple services. A content channel makes it easier for users to find content of interest to them as Internet content libraries are quite vast and can be fragmented by service and category. This allows IPTV (Internet Protocol Television) viewing to be more passive as users will not need to spend time between content playback searching for the next piece of content to play.

The construct of a content channel provides a way for a server to automatically choose content (video, audio, still images or other electronic or digital media), which may be streaming or flat files. The content may be provided to a user, such as displayed on a user-device, output using a speaker or other output mechanism, or stored at a storage location (local and/or remote) that the user can access and retrieve the content. The content chosen for a content channel may come from multiple services and providers. Typically a content asset is a movie, recording, still image data, or other electronic representation. Content is typically meta-data, spoken utterance, keywords, lists, content channels, content assets, categories of content, pre-designated characters, Boolean search terms as well as data that is used to identify or acquire content assets.

One embodiment of the present invention is directed to a method of generating a content channel that includes accessing a list of content assets, utilizing one or more content assets as settings for the content channel, and selecting additional content assets. The selection is based on the settings. The content channel is generated based on the additional content assets.

Another embodiment of the present invention is directed to the method described above and also includes modifying the settings based on user input.

Yet another embodiment of the present invention is directed to the method described above and also includes navigating through the list of available content assets; and providing an indication of a start of a listing of additional content assets.

Yet another embodiment of the present invention is directed to the method described above and also includes providing an indication of an access status of a content asset.

Yet another embodiment of the present invention is directed to the method described above and also includes providing an indication of one or more content assets that are not available to the user.

Yet another embodiment of the present invention is directed to the method described above and also includes providing meta-data of content assets that are not available to the user.

Yet another embodiment of the present invention is directed to the method described above and also includes utilizing meta-data of unavailable content assets as settings for a second content channel.

Yet another embodiment of the present invention is directed to the method described above and also includes identifying a sequential order of the content assets; and providing the content assets as a function of the identified sequential order.

Yet another embodiment of the present invention is directed to the method described above and also includes identifying precedential content for the content assets; and providing the content assets based on the precedential content.

Yet another embodiment of the present invention is directed to the method described above and further includes identifying meta-data related to a content channel seed; and utilizing the meta-data during selection of content. The meta-data includes information from the context in which the content channel seed was selected.

Yet another embodiment of the present invention is directed to the method described above and also includes providing a listing of content that is associated with a particular content channel; and sorting the listing of content based on user input.

Yet another embodiment of the present invention is directed to the method described above and also includes generating one or more seeds; and identifying additional content assets based on the seeds.

Yet another embodiment of the present invention is directed to the method described above and also includes providing additional content assets in a sequence that is based on the degree of matching between the additional content and the seeds and/or settings.

Yet another embodiment of the present invention is directed to the method described above and also includes providing additional content assets in a sequence that is based on user input.

Yet another embodiment of the present invention is directed to the method described above and further includes providing content selections in a random sequence.

Yet another embodiment of the present invention is directed to the method described above and also includes assigning a reproduction status identifier to each content asset.

Yet another embodiment of the present invention is directed to a content channel that includes generating one or more seeds, for the content channel. The seeds being a function of desired content and desired functionality. Content assets are selected from a pool of content assets based on the content assets of the pool and the one or more seeds. An indication of the selected one or more content assets is then presented to a user.

Yet another embodiment of the present invention is directed to the content channel described above wherein content assets are provided to a user device based on user input.

Yet another embodiment of the present invention is directed to the content channel described above and also includes navigating an indication of the selected content assets based on user input.

Yet another embodiment of the present invention is directed to the content channel described above and also includes utilizing content assets that have been accessed by a user to generate additional seeds.

Yet another embodiment of the present invention is directed to the content channel described above and also includes assigning a weight to the content assets based on user feedback and utilizing the weight to select other content assets.

Yet another embodiment of the present invention is directed to the content channel described above and also includes generating search criteria based on user input and utilizing the search criteria in the seed generating step.

Yet another embodiment of the present invention is directed to the content channel described above and also includes utilizing a results list for a search as a list of content assets to seed a second content channel.

Yet another embodiment of the present invention is directed to the content channel described above, wherein the selecting step also includes identifying one or more related content assets based on seeds from a second content channel.

Yet another embodiment of the present invention is directed to the content channel described above and also includes establishing the content channel as being a restricted content channel, providing content assets of the restricted content channel, and controlling modification of the seeds of the restricted content channel.

Yet another embodiment of the present invention is directed to the content channel described above and also includes replicating the content channel; and modifying the replicated content channel.

Yet another embodiment of the present invention is directed to the content channel described above and also includes replicating the content channel; and sharing the replicated content channel with other users.

Yet another embodiment of the present invention is directed to the content channel described above and also includes utilizing user feedback of selected content assets to generate additional seeds.

Yet another embodiment of the present invention is directed to the content channel described above and also includes generating other content channels based on the additional seeds.

Yet another embodiment of the present invention is directed to the content channel described above and also includes generating recommendations based on the additional seeds; selecting recommended content assets based on the recommendations; receiving additional user feedback of the recommended content assets; and modifying the recommendations based on the additional user feedback.

Yet another embodiment of the present invention is directed to a content channel that includes generating one or more seeds based on predetermined criteria; selecting one or more content assets from a pool of content assets based on the content assets of the pool and the one or more seeds; presenting an indication of the selected one or more content assets to a user; and associating one or more codes with the content channel indicating the predetermined criteria.

Yet another embodiment of the present invention is directed to the content channel described above, wherein the codes are not available to the user.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other embodiments and features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 11 shows a series of steps that can be used to modify shared content channels according to yet another embodiment of the present invention.

FIG. 12 shows a series of steps that can be used to clone content channels according to yet another embodiment of the present invention.

DETAILED DESCRIPTION

Figure 1:
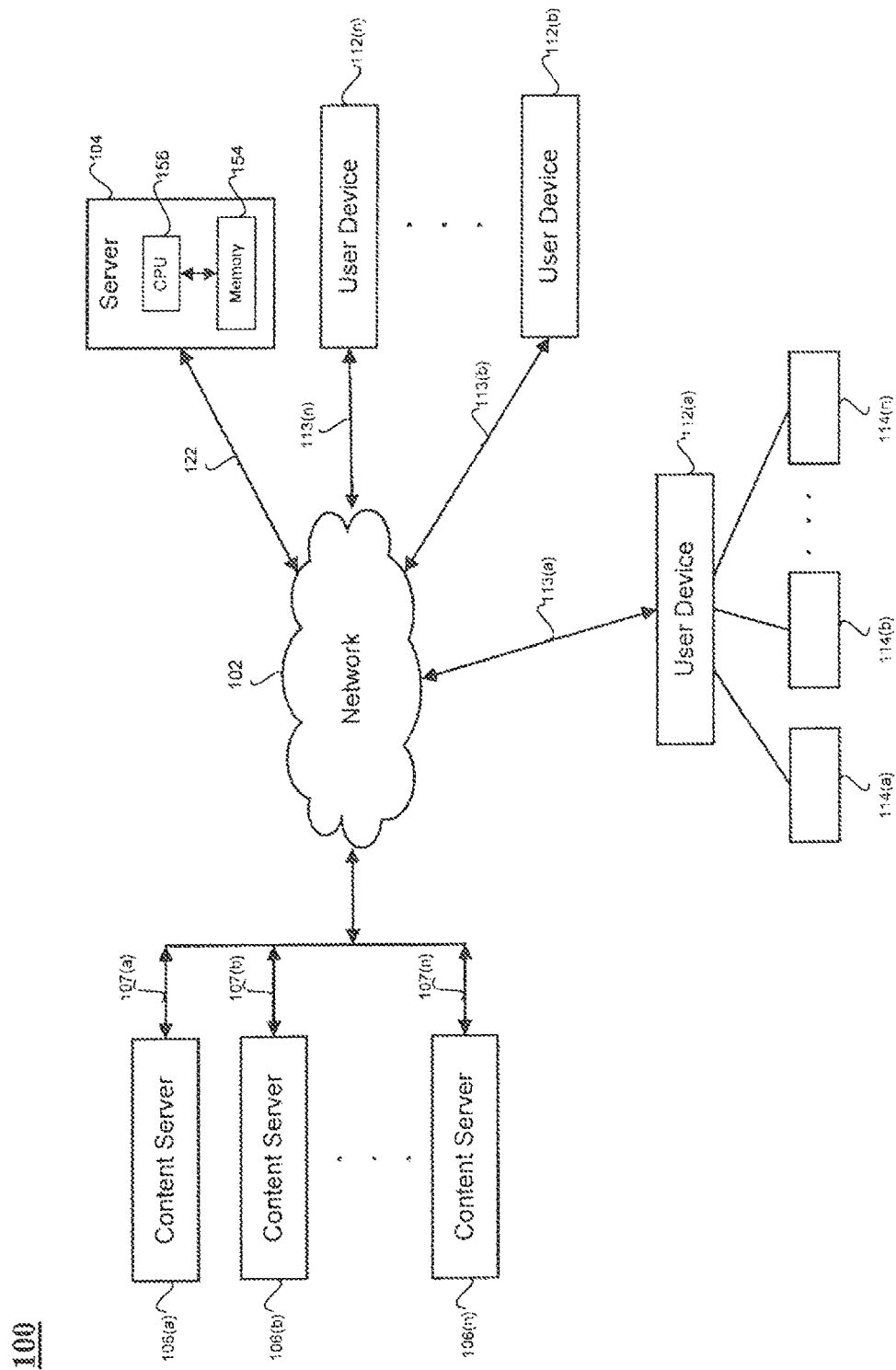
FIG. 1 illustrates an example of a network that supports embodiments of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with each other and/or one or more electronic storage media.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices or modules.

Indeed, the present invention may be implemented in a distributed or "cloud" computing environment in which shared resources, software and information are provided to computers and other devices over a network, which may be, for example, the Internet. "Cloud computing" typically involves delivering hosted services over the Internet. A cloud service typically has three distinct characteristics that differentiate it from traditional hosting. One characteristic is that it is sold on demand, typically by the minute or the hour; secondly, it is elastic—a user can have as much or as little of a service as they want at any given time; and thirdly, the service is usually fully managed by the provider (the consumer needs nothing but a personal computer and Internet access). Significant innovations in virtualization and distributed computing, as well as improved access to high-speed Internet have accelerated interest in cloud computing. The cloud can be private or public. A public cloud typically sells services to anyone on the Internet. (Currently, Amazon Web Services™ is the largest public cloud provider.) A private cloud is a proprietary network or a data center that supplies hosted services to a limited number of people. When a service provider uses public cloud resources to create their private cloud, the result is called a virtual private cloud. Private or public, the goal of cloud computing is to provide easy, scalable access to computing.

"Distributed computing", or "distributed systems" relate to a system of multiple autonomous computers or processing devices or facilities that communicate through a network. The computers interact with each other in order to achieve a particular goal. A computer program that runs in a distributed system is typically referred to as a "distributed program" and "distributed programming" is the process of writing such programs. Distributed computing also refers to the use of distributed systems to solve computational problems. Typically, in distributed computing, a problem is divided into multiple tasks, each of which is solved by one or more computers. In general, distributed computing is any computing that involves multiple computers remote from each other that each has a role in a computation problem or information processing.

FIG. 1 shows a network environment 100 that supports embodiments of the present invention. As shown in FIG. 1, the system includes a communication network 102, a server 104, one or more content sources 106(a), 106(b) . . . 106(n) (where "n" is any suitable number) and a plurality of user devices 112(a), 112(b) . . . 112(n) (where "n" is any suitable number). The user devices (generally 112) may also have associated devices 114(a), 114(b) . . . 114(n) (where "n" is any suitable number) that may be used in conjunction with the user device 112.

The network 102 is, for example, any combination of linked computers, or processing devices, adapted to transfer and process data. The network 102 may be private Internet Protocol (IP) networks, as well as public IP networks, such as the Internet that can utilize World Wide Web (www) browsing functionality. An example of a wired network is a network that uses communication buses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers.

The server module, or facility, or unit, 104 is typically a server, computer, or other processing device(s) such as a desktop computer, laptop computer, and the like. The server module 104 includes one or more memory modules 154 and one or more processors 156 and is bi-directionally coupled with network 102 via wired or wireless medium 122, which are typically bi-directional communication media, which may be for example a serial bus such as IEEE 1394, or other wire or wireless transmission mechanisms to transit audio data, video data, pixel data, streaming data, flat files, or any combination thereof, or any suitable electronic data between network 102 and server 104. The memory module 154 of the server 104 may comprise a plurality of algorithm storage modules that store the algorithms described herein in relation to FIGS. 3-15.

It is noted that the server 104 may be a single server, and also may be implemented as one or more separate servers, which may be used in a cloud computing or distributed computing environment. The server 104 is used to control flow of content from content source modules (generally 106) to user devices (generally 112). The server 104 has associated processing capacity and storage capacity to disseminate the content, via network 102, from one or more content modules (106) to one or more user devices (112).

Content source modules 106(*a*), 106(*b*) . . . 106(*n*) are typically electronic storage media that store electronic content, such as content assets, that may be provided to user devices 112. The content source modules 106 may be for example repositories of audio data, video data, IMDB (Internet Movie Data Base), streaming video storage locations or other suitable locations that store video data, audio data, pixel data or other electronic content that a user may wish to access (view and/or listen) using devices 112. Content source modules 106(*a*), 106(*b*) . . . 106(*n*) are in bi-directional communication with network 102 via associated communication medium 107(*a*), 107(*b*) . . . 107(*n*). The communication media (generally 107) are typically bi-directional communication media, which may be for example a serial bus such as IEEE 1394, or other wire or wireless transmission mechanisms to transit audio data, video data, pixel data, streaming data, flat files, or any combination thereof, or any suitable electronic data between network 102 and content source modules 106.

Figure 2:
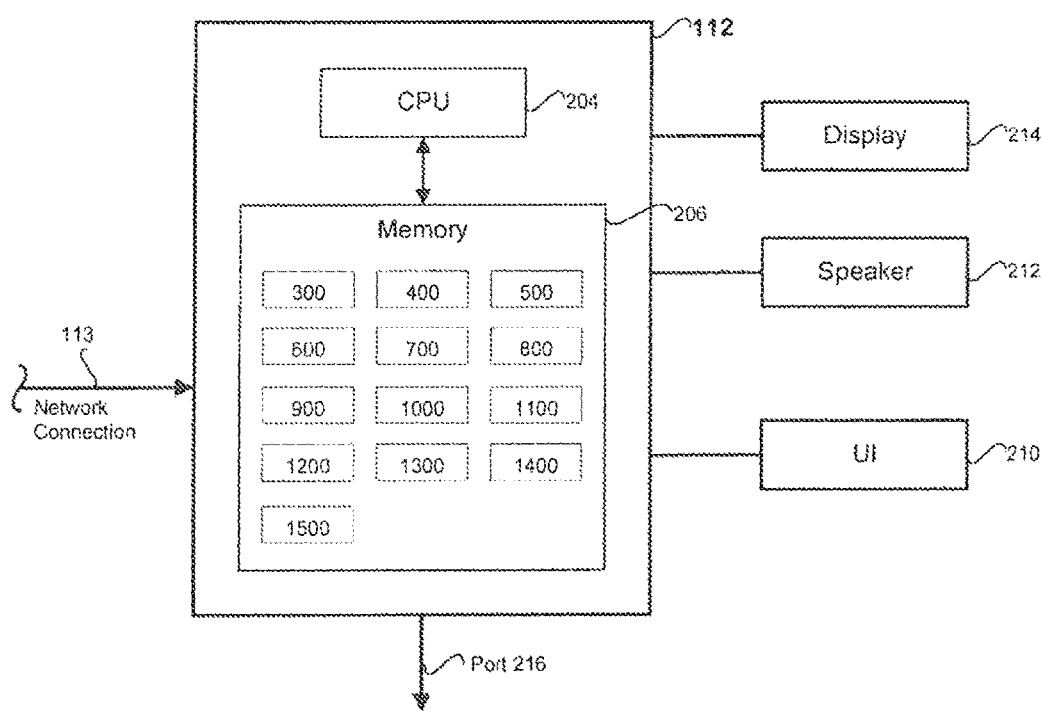
FIG. 2 shows an example of a display device that may be used according to an embodiment of the present invention.

User devices 112(*a*), 112(*b*) . . . 112(*n*) (where "n" is any suitable number) are typically consumer electronic devices such as a television, IPTV television, computer, such as a VAIO PC™, VAIO™ laptop, Mylo™, or other apparatus with sufficient processing and storage capability, or any device with a web browser to display and/or store electronic content. The user devices 112(*a*), 112(*b*) . . . 112(*n*) are typically connected to the communication network 102, via associated communication medium 113(*a*), 113(*b*) . . . 113(*n*). The communication media (generally 113) are typically bi-directional communication media, which may be for example a serial bus such as IEEE 1394, or other wire or wireless transmission mechanisms to transit audio data, video data, pixel data, streaming data, flat files, or any combination thereof, or any suitable electronic data between network 102 and user device 112. User device 112 may be any suitable consumer electronic (CE) unit or module or device. As shown in FIG. 2, the user devices 112 may be computer products.

A second device 114(*a*), 114(*b*) . . . 114(*n*) (where "n" is any suitable number) (generally referred to as 114 herein) may be associated with the user device 112 and may act as a visual aid to the user device 112, particularly when the user device 112 is an IPTV device. The second device(s) 114 typically include devices such as a cellphone, laptop, etc., which execute a program that allows the second device 114 to act as the visual aid to the user device 112.

FIG. 2 shows an example of a user device 112 that may be used according to an embodiment of the present invention. User device 112 typically includes a central processing unit (CPU) 204 and memory 206. The user device 112 also has a user interface (UI) 210, speaker 212, display unit 214 and I/O port 216. Often a device will be connected to another device for peripheral capabilities for output, such as a BLU-RAY™ player connected to a TV and/or home theater system. Also, there may be a plurality of speakers (or display units), such as with a surround sound system. The system may also utilize an internet radio device. The user device 112 also has a bi-directional communication channel 113, as described above.

The display unit 214 is typically an LCD display, plasma, high definition television screen, laser phosphor display, or other device suitable display unit to display electronic data, for example, in the form of pixels.

CPU 204 is a processor, such as, by way of example and not limitation, an Intel Core™ 2 microprocessor or a Frescale™ PowerPC™ microprocessor, or other suitable processor used to process the data in memory 206.

Memory unit 206 is an electronic storage medium suitable to store electronic data, including streaming files, flat files, audio and/or video data or any combination thereof. memory 206 may also include data storage devices, or units 300, 400, 500, 600, 700, 800, 900, 1000, 1100, 1200, 1300, 1400 and 1500 to store the algorithms as described herein in relation to the related figures, 3-15, respectively. The electronic storage modules may include a magnetic disk or an optical disk, and drive (not shown), such as a CD-ROM, DVD-ROM, capable of reading/writing data onto a removable medium, Read Only Memory (ROM) and Random-Access Memory (RAM).

The user device 112 further includes an input and output interface unit, or user interface (UI) 210, which may include a receiver to receive spoken commands and spoken utterances that may be used to obtain content assets, as described herein. Coupled to the input and output interface unit 210 may be other peripheral devices such as, e.g., a keyboard or mouse, an output device, or unit (not shown). Also shown coupled to user device 112 are speaker 212 and auxiliary display 214 such as, e.g., a CRT or LCD display. The user device 112 may be equipped with a browser program suitable for communication with the World Wide Web.

One skilled in the art will recognize that, although components are depicted as different units, the components can be parts of the same unit or units, and that the functions of one can be shared in whole or in part by the other, e.g., as RAM disks, virtual memory, etc. It will also be appreciated that any particular computer may have multiple components of a given type, e.g., processors, input devices, etc.

The memory 206 may store an operating system such as Microsoft Windows™, Linux, Mac OS™, Unix™, Android™ or iOS™.

The user device 112 may also include additional components and/or systems, such as network connections, additional memory, additional processors, network interfaces, input/output ports or busses or receivers to receive spoken utterances. Also the programs and data may be received by and stored in the system in alternative ways. For example, a computer-readable storage medium (CRSM) reader, such as, e.g., a magnetic disk drive, magneto-optical drive, optical disk drive, or flash drive, may be read from a computer-readable storage medium (CRSM) such as, e.g., a magnetic disk, a magneto-optical disk, an optical disk, or flash RAM. Further, it will be appreciated that the term "memory" herein is intended to include various types of suitable data storage media, whether permanent or temporary, such as transitory electronic memories, non-transitory computer-readable medium and/or computer-writable medium.

Figure 3:
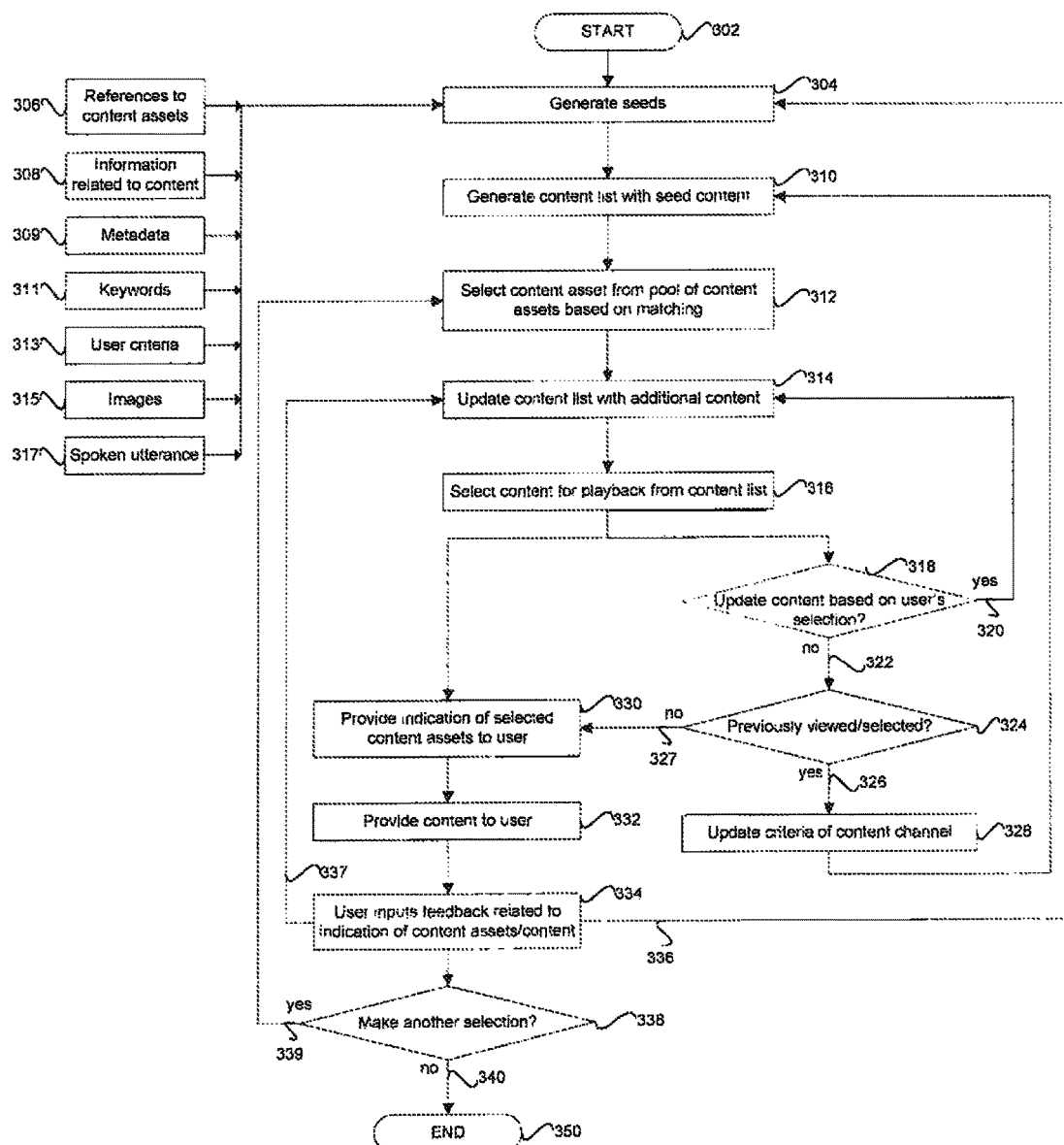
FIG. 3 shows a series of steps to create and display content channels according to another embodiment of the present invention.

FIG. 3 shows a series of steps 300 to create and display content channels according to another embodiment of the present invention. The steps 300 may be stored on a suitable electronic storage medium, such as a computer-readable medium, which may be non-transitory, or RAM. The steps 300 may be object code, source code, or stored on a dedicated storage medium, either local to the user device (FIG. 1, device 112) or at a remote location, (FIG. 1, server 104) and accessed as desired. Thus the steps 300 may be considered a module when stored and/or accessed and/or retrieved, regardless of the type of storage medium.

As shown in FIG. 3, the process 300 begins with start step 302. References to seed content are acquired and used to generate one or more seeds, as shown in step 304. The seeds are derived from references to content assets (306), information related to content assets (308), meta-data associated with a content asset (309), keywords (311), user criteria (313), images (315) and/or spoken utterance (317). A content asset is typically electronic content such as audio data, video data, streaming video data, pixel data, files or other content that may be accessed by a user.

A content list may be generated utilizing the seed content references, as shown in step 310 and additional content is acquired based on the seed content references, as shown in step 312. This acquisition is based on matching the seed content references with content assets that are in a pool, or collection of content assets. A suitable matching algorithm may be used to provide the closest matched content assets based on the seeds used to select content assets.

The pool of content assets may include content assets that are not available to a particular user. This may be because the rating of the content asset exceeds a permitted rating for the user (i.e., the content asset is rated "R" and the user's permitted rating is only "PG"), or the content asset requires hardware and/or software that is not available to the user device. Thus, while the content asset may not be compatible with the user and/or user device, the seeds of that content asset may be used to seek other more suitable content assets for the user/device, which may be available to the user. Another example is that the user inputted seeds from a rented movie, which was returned. Thus, the user no longer has access to the rented movie, but the seeds of the rented movie are used to identify content assets. Furthermore, a content asset may not be available to a user because the content asset is not available in the country or geographical region where the device is located. The location of the user device may be tracked or monitored based on GPS (global positioning satellites), or Internet Protocol (1P) address of the user device.

The particular content list is updated with the additional content assets, as shown in step 314 and content is selected for access, such as playback from the content list, as shown in step 316. When the user is passively consuming the content, the next asset in the list can be chosen automatically and provided once the current asset ends. For example, if the content assets are movies, the next movie will begin playing as soon as the current movie ends. Thus, the content channel provides a constant supply of selected content to the user without the user taking any additional action.

A determination is made whether to update the content based on a user's selection, as shown in step 318. One option is to update the content list, as shown by line 320 reaching update content step 314. Another option is that a determination is made whether the content has been previously accessed, which may include, viewed and/or selected and/or listened to as shown in step 324 (line 322). Criteria of a content channel can be updated, as shown in step 328, which is reached, via line 326, following the determination step (324). This process can be used to modify the content assets based on previous selections by a user. For example, if a user watches an episode of "South Park" the system (described in FIG. 1) will match characteristics of that content (i.e., animated, comedy, mature themes) to other content. A match may include "the Simpsons" since that content is also an animated comedy with mature themes. The updated criteria (328) can be provided to generate a content list, as shown in step 310.

If the content has not been previously accessed (viewed/listened to/selected), line 327 shows that an indication of the selected content asset is provided to a selected user device, as shown in step 330. The indication may include, for example, the title of the content asset, a summary of the content asset, a sample portion of the content asset or other portion or identifying information that provides insight into the content asset. Thus, a user may view a list of titles of content assets and then determine which, if any, of the content assets the user wishes to access. Also, the sequence of the indication may be ordered such that the content assets that match the seeds most closely are listed first. Thus, the user will have a more efficient listing of matching content assets. This provision may be a display on a display apparatus, output to a speaker, transmission to a storage location for subsequent access, or other output and/or storage and/or transmission function.

The content asset is provided to the user device, as shown in step 332. This provision may be playing a movie, providing audio content or other display of the desired content asset.

A user may provide feedback, or other input based on the indication (title, summary, etc.) of the content asset, as well as feedback to the content asset provided in step 332, as shown in step 334. This input may be to delete the content asset or access the content asset to view on a user device. The user input is used to update the content list (314), reached via line 337 as well as generate seeds (304), via line 336. Also, the user may make another selection, if they wish, as shown in determination step 338. If the user wishes to make another content selection, selection step 312 is reached via line 339. If the user does not wish to make another selection, end step 350 may be reached via line 340.

Figure 4:
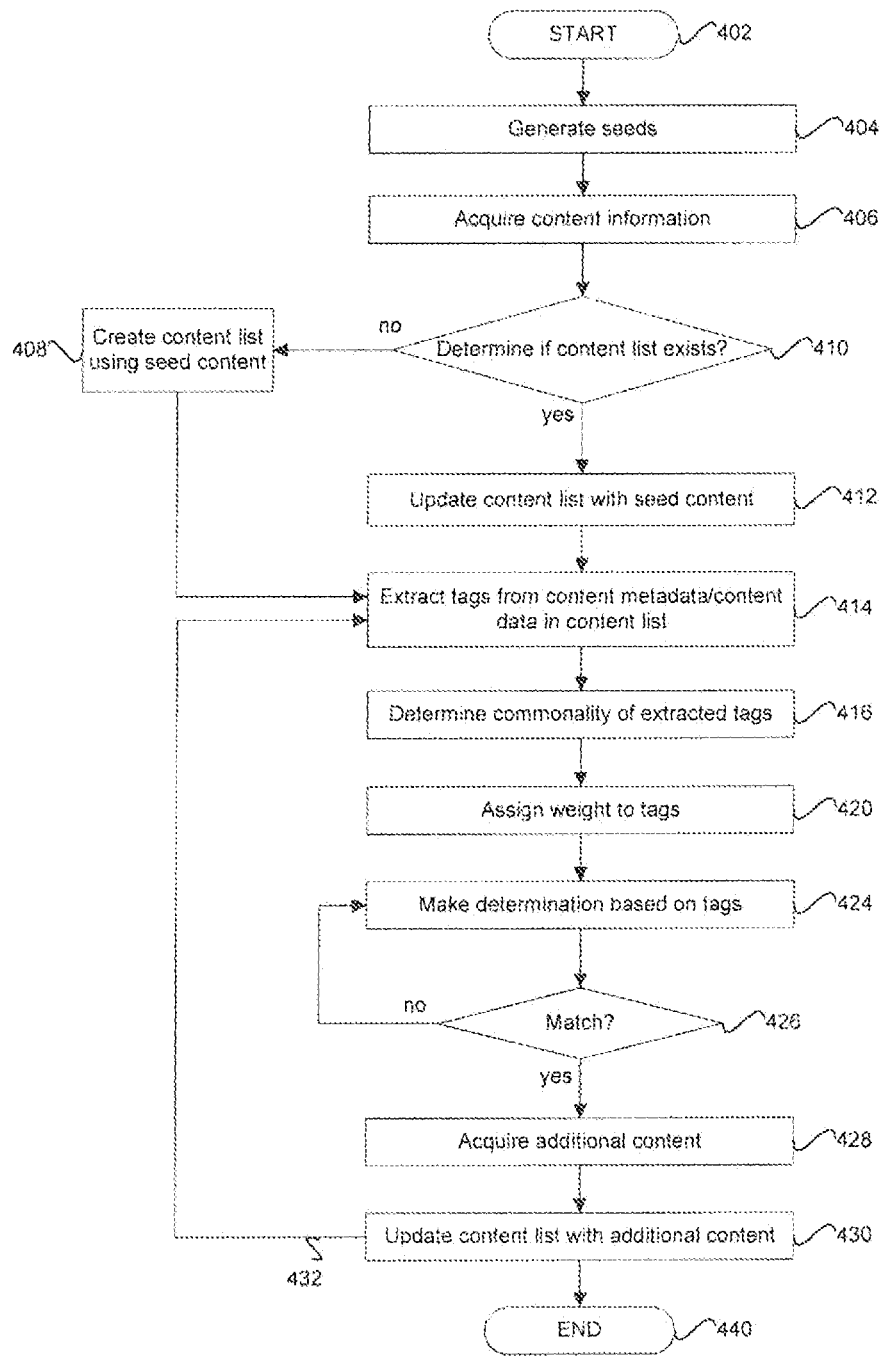
FIG. 4 illustrates a series of steps that can be used to modify and display content channels according to yet another embodiment of the present invention.

FIG. 4 illustrates a series of steps 400 that can be used to modify and display content channels according to yet another embodiment of the present invention. The steps 400 may be stored on a suitable electronic storage medium, such as a computer-readable medium, which may be non-transitory, or RAM. The steps 400 may be object code, source code, or stored on a dedicated storage medium, either local to the user device (FIG. 1, device 112) or at a remote location, (FIG. 1, server 104) and accessed as desired. Thus the steps 400 may be considered a module when stored and/or accessed and/or retrieved, regardless of the type of storage medium.

As shown in FIG. 4, the process 400 begins with start step 402. Seeds are generated, as shown in step 404 and information about the content is acquired, as shown in step 406. For example, if a user is interested in cartoon comedies with adult themes, such as "South Park", it is not necessary for an actual episode of "South Park" to be acquired or played in order for the characteristics of the content to be used to make a determination that an episode of "The Simpsons" is a good match for content of cartoon comedies with adult themes. A determination is made if a content list exists that is associated with that seed content, as shown in step 410. If a content list does exist, the content is updated with seed content, as shown in step 412. If the content list does not exist, a content list is created using the seed content, as shown in step 408.

Tags are extracted from content meta-data and/or content data in the content list, as shown in step 414 and a commonality of extracted tags is determined, as shown in step 416. The tags are assigned a weight, as shown in step 420 and a determination of appropriate additional content is made based on the weighting of the tags, as shown in step 424. A matching step is performed to determine whether the additional content is similar, or within a predetermined threshold, as shown in step 426. When the additional content is determined to be an acceptable match, the additional content is acquired, as shown in step 428.

The content list is updated with additional content as shown in step 430. The updated content list may then be used as a source from which tags may be extracted, as shown by step 414 being reached, via line 432. The process ends, as shown in step 440.

Figure 5B:
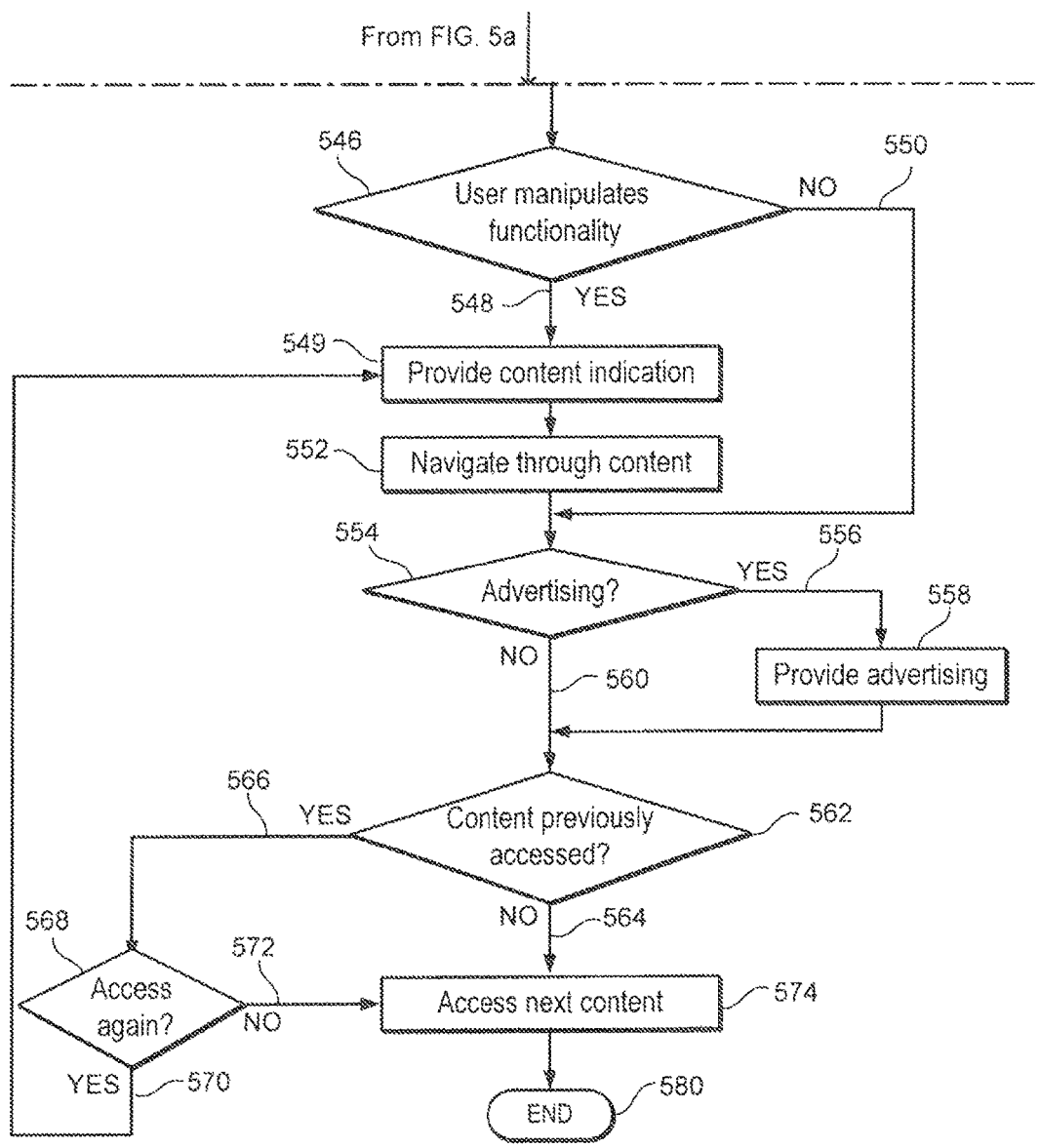
FIG. 5 illustrates a series of steps that can be used to obtain and display content channels according to yet another embodiment of the present invention.

FIG. 5 illustrates a series of steps 500 that can be used to obtain and display content channels according to yet another embodiment of the present invention. The steps 500 may be stored on a suitable electronic storage medium, such as a computer-readable medium, which may be non-transitory, or RAM. The steps 500 may be object code, source code, or stored on a dedicated storage medium, either local to the user device (FIG. 1, device 112) or at a remote location, (FIG. 1, server 104) and accessed as desired. Thus the steps 500 may be considered a module when stored and/or accessed and/or retrieved, regardless of the type of storage medium.

The process begins, as shown in step 502. One or more initial content assets may be obtained, as shown in step 504. The content assets for the channel are selected based on settings. Settings for a content channel can contain references to content selections that are used as "seeds" when choosing content selections for the channel, as shown in step 506. The settings may be derived from content sources.

The content may be provided from across multiple services and sources (508, 510, and 512) that have some commonality based on criteria defining the content channel. Typically, one or more content channels are seeded by content references. These content references are used when determining what content to select for the channel. Additionally, the content channel can have keywords (514) and tags (516) that guide content selections that would be appropriate for that channel. Other sources of content seeds include, for example, other content channels (518) and references to lists (520), images (521), spoken utterances (523), audio (525) and another content list (527). Thus, content channels can be seeded by references to lists of content as well as references to content. An example would be a reference to a user's favorites list. As the user adds references to content to their favorites list, those new references influence content that is chosen for a content channel that is seeded with a reference to the user's favorites list. The list of references to content used as seeds in a content channel can be referenced as a seed in another content channel. Content channels can be seeded by references to other content channels. A content channel may include content selections for that channel that are picked automatically based on zero or more settings.

A channel may be seeded by more than one content list. Some content lists may be specific to a particular channel while others may be external to the channel. An example of a list that is specific to a channel would be a list that is automatically created by the channel to hold content selections that the user adds to the channel as seeds.

Lists that are specific to a particular channel can be considered to be owned by that channel. An example of a content list (527) that is external to a channel would be a channel that is seeded by a reference to a user's list of favorites. Lists that are used as seed lists for channels may be used to store meta-data about the content items in the list, such as title and description, in the list so that a content item in a list can continue to be used as a seed for the channel even if the content becomes unavailable and can no longer be played. It is another embodiment of the present invention to utilize one or more external lists of content as a source of seed information for picking or selecting content.

Furthermore, the content may be viewed on a variety of different display devices and Internet content may be viewed from a variety of different sources in a consistent manner. References to content selections from multiple services act as criteria for automatically selecting similar content from across multiple services.

The content references may be stored, as shown in step 522 and the content references may be used as seed references, as shown in step 524. An algorithm, or user, or viewer, may select content from the seed references, as shown in step 526.

Content channels may optionally have other settings, as shown in step 528, such as the preferred language. These settings may be used in the content setting step 506, described above. Content channels may have various optional filters, as shown in step 530 that prevent content that matches the filter criteria from being selected for the channel. Content channels can be filtered by content rating settings to limit the content selected for that channel by the content rating. Thus mature themes and content with a rating of "R" can be excluded. Also, user device capabilities may be used as filtering criteria, as well as language of the content.

Other desired additional filters may be based on many things, including keywords, codex used, file format, image size, aspect ratio, and bit rate, as shown in step 532.

Following desired filtering, content of a content channel may be provided to a user, at one or more designated user devices, as shown in step 534. Once a content channel, and the associated content is provided to a user, that content may be used as a basis for additional content (536) for that channel, or as a basis to seed another content channel (538), as shown by line 540 leading to content setting step 506.

The data about the content channel may be recorded, as shown in step 542. For example, content channels can maintain meta-data about items, such as content or lists, that are referenced as seeds for the content channel so that if the referenced item ceases to be accessible, the influence on the content channel of having that item referenced as a seed is not affected. Users can passively watch or listen to a content channel as the system will make more content selections for a content channel as needed. Thus, subsequent content can be displayed to one or more desired user devices, as shown in step 544.

A user, upon viewing the content channel may manipulate the playback functionality, as shown in step 546. This manipulation may include "fast-forward", "pause" "rewind" and similar function controls for the content. If a user desires to manipulate the functionality an indication of the content assets are provided, which may include, displaying or otherwise providing a portion or all of the content, based on that functionality, as shown in step 549. The user may also navigate the content, as shown in step 552. For example, the choices made for a content channel are recorded as data about the channel. A user can navigate through these choices.

The content assets may include advertising content, such as commercials, trailers, or other audio and/or video and/or image content, as shown in step 554, if so, the advertising is provided, as shown in step 558, via line 556. For example, advertising content may be inserted into a content channel as part of the content channel that is provided to a viewer. The selection of ads to play can be influenced by the content channel settings that are used to pick content for the channel. For example, the navigation choices given to a user may be limited. An example would be to not allow navigation through the history for a radio station. Another example would be to not allow skipping forward or fast-forward through ad content.

If there is no advertising content, a determination is made whether the content has been previously accessed, as shown in step 562, via 560. If so, the user may choose whether they wish to access the content again, as shown in step 568. For example, the repeat access step 568, enables a user to indicate that they wish to access (view/listen to) a piece of content again. The content is selected once more as if it had not been selected the first time. For example, a user may not have been paying attention, and would like to view the full content a second time, or any subsequent times. As will be discussed in more detail below, as user may also choose to allow the content to be chosen again repeatedly, after a time period or number of pick limits, such as a favorite song picked by an audio channel.

If the user wishes to access (view/listen to), the content again, the content is displayed again, as shown by line 570 to the display content step 549. If a user does not wish to access the content again, the next content is accessed, as shown in step 574, via line 572.

The process ends, as shown by end step 580.

Content channels use their history information to keep from repeating previous selections. The restriction on previous content could prevent a content selection from being repeated as long as there is more content available that fits the settings for that channel. A restriction to not view previous content a second time could be relaxed for a channel, such that a radio station channel may prevent any of the last 40 selections to be chosen next. The restriction on previous content could also be relaxed for a channel, such that no content that was played for that channel in the last 24 hours can be picked next. As stated previously, a user may select a "black-out" a period of time during which they do not wish to view/listen to selected items of content, after which the content may be provided to the user. Thus, if a user has heard a particular song repeatedly, they can block that content for a particular time.

Typically, when playback reaches the end of each piece of content, playback of the next piece of content will begin automatically. When playing a content channel, a user can skip to the next content selection at any point. When playing a content channel, a user can be allowed to control the playback with all standard controls, such as pause, fast-forward, rewind, and skip to the beginning.

Figure 6B:
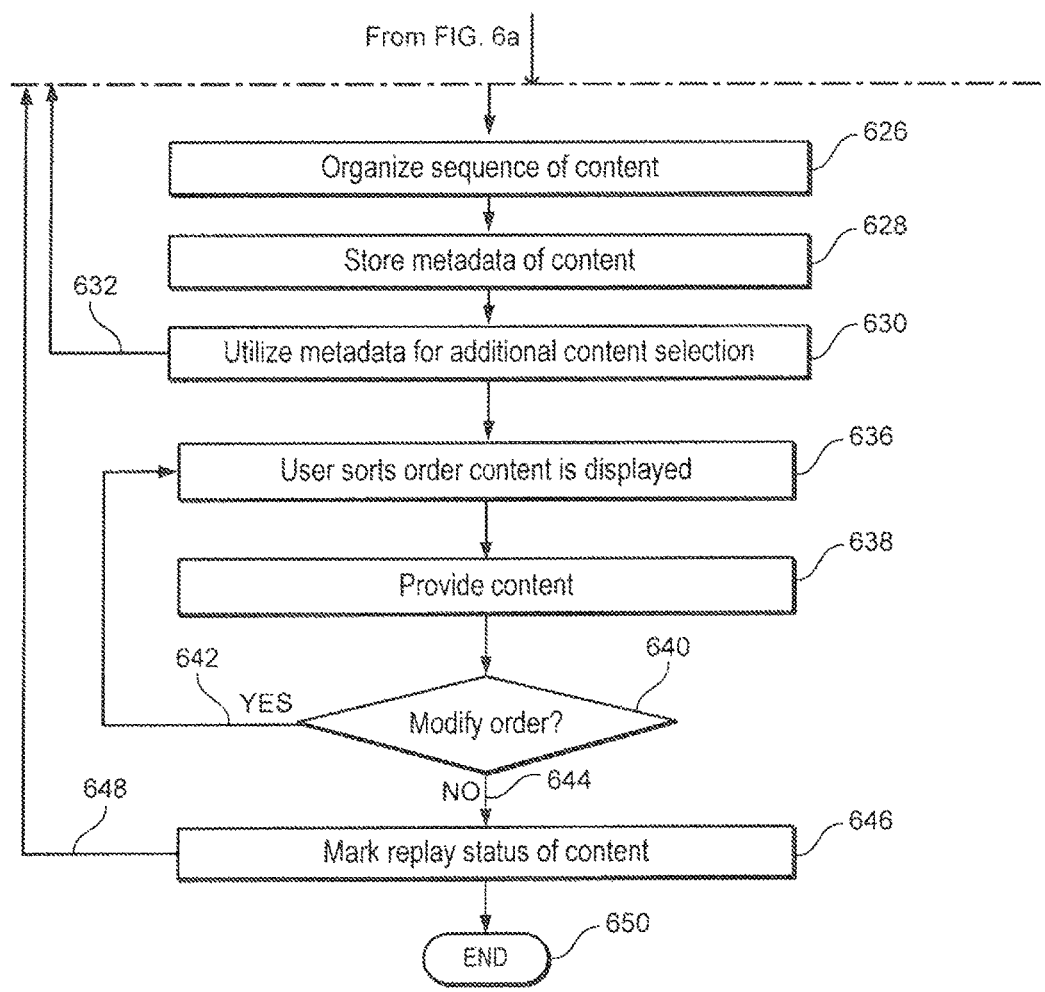
FIG. 6 illustrates a series of steps that can be used to modify settings and display content channels according to yet another embodiment of the present invention.

FIG. 6 illustrates a series of steps 600 that can be used to modify settings and display content channels according to yet another embodiment of the present invention. The steps 600 may be stored on a suitable electronic storage medium, such as a computer-readable medium, which may be non-transitory, or RAM. The steps 600 may be object code, source code, or stored on a dedicated storage medium, either local to the user device (FIG. 1, device 112) or at a remote location, (FIG. 1, server 104) and accessed as desired. Thus the steps 600 may be considered a module when stored and/or accessed and/or retrieved, regardless of the type of storage medium.

The process starts, as shown by start step 602. A presentation of content, or a list of content, that is available for a channel may be presented to the user, as shown in step 604. The list could be a catalog of available content from one or more services. The list could be organized into categories and sub-categories or by channels and times. The history for a content channel might be another source of content that may be used in step 604. For example, the presentation may be in the form of a schedule list, such as an EPG (electronic program guide) that the user can navigate through, as shown in step 606 and indicate a selection from the displayed list, typically by using a control device, such as a remote controller.

A history of the content channel is provided to the user, as shown in step 608. When navigating through the history for a content channel (608), a user can select any of the content selections to be added to the settings for the channel as a content reference to be used as a seed when choosing future content selections for the channel, as shown in step 610. Users can create any number of new named content channels and set the criteria that these channels use when selecting content. Users can view and modify the settings for any content channel they created, as shown in step 612.

A user can utilize the modified settings, as shown in step 614. The modified settings (614) can be used to identify additional content, which may be presented to the user, as shown in step 604 (line 616). Also, as shown by line 616, the list of content could also be available choices for a content channel, since the modified settings (614) can be used in step 604.

Thus, while line 616 shows an embodiment in which modified settings are used to generate a list of content, it is also an embodiment of the present invention that after the modified settings are established, a content channel may be generated based on the modified settings, as shown in step 618. This embodiment (i.e., not using the loop-back feature shown in line 616) does not provide the history of the content channel to a user after the settings have been modified. A user may then navigate through content listings of a content channel, as shown in step 620. This navigation through a list of content includes commands such as "forward" and "backward", or "navigate" through the content in a list form.

Furthermore, when navigating forward through the content selections made for a content channel in list form, the user may indicate a status of previously accessed selections. These status identifiers may include "viewed", "partially viewed", "not viewed", "allowed to be replayed", "allow re-play multiple times", "allow re-play 'n' times", "allow re-play after 'x' hours" or other suitable indication, as shown in step 622.

Meta-data of content that a user may not be authorized to view/listen/access, or does not have technical device capability or functionality to view/listen/access may be provided to a user as a way to generate a content channel that has similar content to the unauthorized content, as shown in step 624. Thus, users are able to navigate through the list of content references that is/was used to seed a content channel as they would through any other list of content. This includes accessing (listening, viewing, playing, storing) any content that they have authorization to access as well as being provided an indication of their lack of authorization for the other pieces of content. For example, users may access and view the meta-data for any seed content that they do not have authorization to play. For example, a user may have rented a movie and added it to the seed list for one of their content channels. After the rental expires, the user is no longer authorized to watch that movie, but the movie information is still part of the seed list for the content channel and thus influences the content selections for that channel the same way it did before the rental expired.

Since substantial content that a user may wish to access may be part of a series, album or accumulation of content, the content of the content channel may be organized based on a sequence, or ordering or chronology of the content (precedent), as shown in step 626. Indeed, content that is typically necessary or helpful to understand other content may be deemed precedential content such that the provision of precedential content occurs prior to other desired content. This way, the content is set in the proper sequence. If a user does not care to access (view/listen to) precedential content, such content may be skipped or rejected.

For example, during the process of content channel selection, selecting an item in a series, such as episode 3 of a series of seven episodes, means that the channel picks episode 1 of the series first if the whole series is a good match for the content channel. If there is subject matter in episode 3 of the series but not the other episodes that match the content channel, then episode 3 should be chosen for the content channel and the other episodes can be left out of the picks for that channel. Thus, some content assets may be deemed precedential to other content assets since subsequent content assets build, or derive from earlier content assets.

The meta-data of the content may be stored and utilized for subsequent content selections for the content channel, or selections for a related content channel, as shown in steps 628 and 630 and line 632 showing that presentation step 604 is reached. The presentation (604) will utilize the meta-data of step 630. For example, meta-data about the context in which each piece of content was found when it was added to a content channel as a seed can be stored with the content reference to influence subsequent content selections. This meta-data may include the category, content channel, or list the content was in, or other identifying data. The meta-data may also include search terms that were used to find the content if it was added from a set of search results. Furthermore, there are numerous methods for generating meta-data from the content data. For one instance, meta-data can come from a service provider who provides the content. Alternatively, meta-data may come from a source of meta-data, for example, Gracenote™ and/or IMDB™, which provides meta-data about content. In another instance, meta-data can come from Sony™ using a content analysis process that generates actual audiovisual information about that content. For example, in the case in which a server did not get sufficient meta-data from a service provider about their content, the server content analysis process may be used in conjunction with other known data can provide additional actual meta-data.

A user may sort the order, or sequence, that content is displayed, as shown in step 636. For example, when viewing the list of content chosen for a content channel or a list of content used as a seed for a content channel the user may sort the order in which the content is listed. This sorting may be performed automatically by the user selecting one or more sorting criteria or categories, such as alphabetical, chronological, and popularity. Alternatively, the user may perform the sorting manually by re-arranging the order, or sequence, of the list of content. In such an embodiment, the user will provide input to modify the programmed steps of algorithm 600. The user may access the content, or an indication of the content, such as the title, summary or the actual content, as shown in step 638.

The order of sorting may also be changed as shown in step 640. For example, the user may sort to reverse the ordering of the content. If the order is modified, step 636 is reached via line 642. The user may also play the list of content chosen for a content channel or display a list of content used for as a seed for a content channel in a continuous manner. This includes having the items play from first to last in the order in which the user sorted the list at the start of playing. This also includes playing the items continuously in a "shuffle play" manner. In addition to shuffle play, there is also "single play" that plays the content once and then ends and "repeat play" that plays the content selections through in order, then loops back to the beginning and keeps replaying the list. There is also "continuous play" that causes new selections of content to be generated such that a new selection of content is provided as the last selection on the list of content ends.

After viewing selected content, a user may assign a reproduction status identifier which indicates repetition of the content asset, such as "replayable once" or "replayable repeatedly", as shown in step 646, reached via line 644. The reproduction status identifier is typically a flag, indicator, user-input instruction or other program code that defines reproduction functionality of an associated content asset. The reproduction status identifier associated with a content asset may be changed by a user. For example, using the reproduction status identifier to mark an item as replayable once enables a user to re-access, or re-play content that they wish to access another time, such as at a later time or date. This is useful if the user was not paying attention when the content was chosen and would like to see it again when watching that content channel. The content identified with a reproduction status identifier may be presented again, as shown in step 604, reached via line 648.

The process 600 ends, as shown by end step 650.

It is also an embodiment of the present invention that a user may also navigate past the selections that have already been made. Thus, new selections will be made for the channel and displayed to the user to navigate through. The user is also able to see where the end of the current set of selections is and control when new selections are made due to their browsing behavior. Furthermore, the history for a content channel typically contains information about which content selections have been viewed by the user, partially viewed by the user, and completely "un-played", or not accessed by the user.

As described above, content channels allow a user to passively watch an "endless" (new content may be continuously added) series of non-repetitive content that is of interest to them from across a wide variety of content services and providers. Users can fine-tune the choices made for the content channels to improve the fit between the selections made and their interests. With the vast volume of content available from an increasingly fragmented set of providers the use of content channels makes accessing content that is chosen by a content channel more efficient.

When accessing content assets, such as viewing or listening to the asset, users may navigate through the asset. This includes "pause", "fast-forward", "rewind", "skip forward", "skip backward", or "navigate". Skipping forward may require another content selection to be made for the channel.

Figure 7:
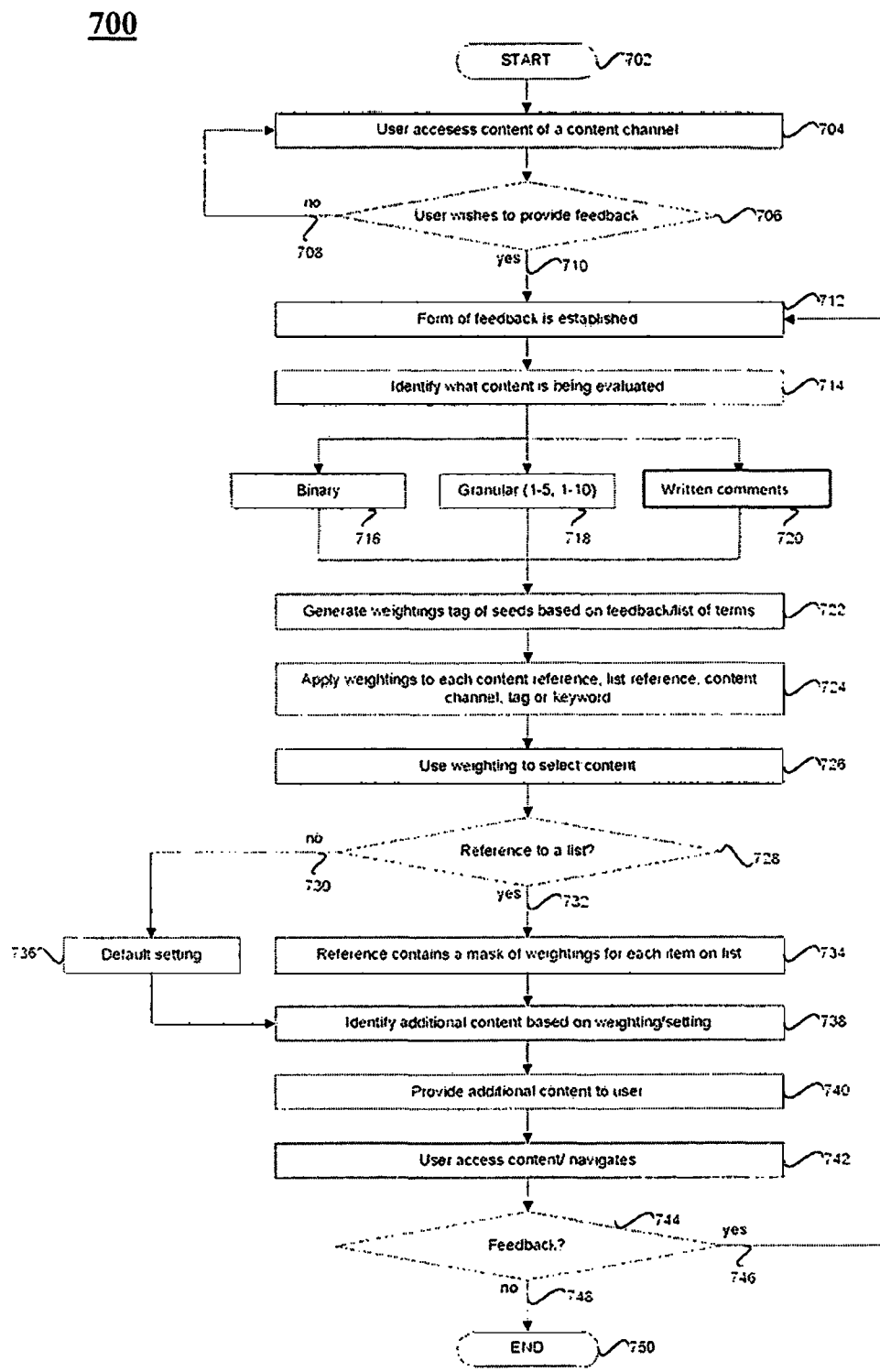
FIG. 7 illustrates a series of steps that can be used to evaluate and display content channels according to yet another embodiment of the present invention.

FIG. 7 illustrates a series of steps 700 that can be used to evaluate and display content channels according to yet another embodiment of the present invention. The steps 700 may be stored on a suitable electronic storage medium, such as a computer-readable medium, which may be non-transitory, or transitory, such as RAM. The steps 700 may be object code, source code, or stored on a dedicated storage medium, either local to the user device (FIG. 1, device 112) or at a remote location, (FIG. 1, server 104) and accessed as desired. Thus the steps 700 may be considered a module when stored and/or accessed and/or retrieved, regardless of the type of storage medium.

The process 700 begins, as shown in start step 702. A user may access (e.g., view or listen to or otherwise experience) content of a content channel, as shown in step 704. When viewing, or listening to, a content selection from a content channel the user may provide feedback regarding how well the user thinks the particular selection fits the criteria for the channel, as shown in step 706. Alternatively, a user may wish to provide feedback regarding a previously accessed content asset.

If the user does not wish to provide feedback, the content is accessed, as shown by line 708 leading to access step 704.

If the user wishes to provide feedback, a form or the feedback is established, as shown in step 712, reached via line 710. The content being evaluated is identified, as shown in step 714. Users may give feedback about the current content asset selection that is playing, or rate previous content asset selections when viewing the history of selections for the content channel. This rating can be a binary, i.e., a "thumbs up" or "thumbs down" rating as shown in step 716, or can be more granular, such as a numerical rating scale of 1-5, or 1-10 indicating an opinion, as shown in step 718, or may be written comments, as shown in step 720, or other suitable rating tool to indicate the user's opinion of the content match. When written comments are provided, the comments can be incorporated into a rating of the content asset. The feedback may also be a combination of the above-listed formats, such as a "star" rating with written comments. The "star" rating may indicate one level of satisfaction, which may be objective, or quantitative, and the written comments can be used as a subjective, or qualitative, rating. Therefore the feedback may include a quantitative component as well as a qualitative component.

The seeds in a content channel may be weighted and thus, generate a weighting tag of the seeds based on user feedback, as shown in step 722. The higher the weighting, the more influence that seed has on the content chosen for that content channel. These weighting can be applied to each content reference, list reference, content channel reference, tag or keyword, as shown in step 724. A seed with a negative weighting causes content that is similar to the negatively weighted seed to be less likely to be chosen for a content channel. The more negative the weighting, the more influence the weighting will have eliminating similar content from being chosen for the content channel. The weighting functionality can be based on an algorithm 700 calculating a weight coefficient. Alternatively, a user may input a weight using an input device, such as a UI, as described herein.

Thus, the weightings are used to select additional content, as shown in step 726. Each list of seed content for a content channel can be given a weighting which determines how much influence that list has on content choices. There may also be weightings for each list of terms or keywords used to seed the content channel.

The use of seeds with negative weightings can influence the choices for a channel by making similar content less likely for that channel. One way this feedback influences future selections for the content channel is to add the rated content selection to the seed list for the channel with a positive or negative weighting based on the users feedback on the content's fit with the content channel. This list would automatically be created in the criteria for a content channel if it does not already exist.

The content seed selections made based on user's feedback can be kept in a separate list of seed content for that channel. If the content channel has a reference to a list, as shown in step 728, then that list reference can contain a mask of weightings for each item in the list, as shown in step 734, reached as shown by line 732. A default weighting may be used for each content selection in the list that was not explicitly assigned a weighting in the mask, as shown in step 736, reached via line 730.

Based on default setting or the mask of weightings for each item, additional content assets may be identified by utilizing the weightings and/or settings, as shown in step 738. The additional identified content may be provided to the user, as shown in step 740 and the user can access the additional content and/or navigate through the additional content, as shown in step 742.

The user may provide feedback with respect to the additional content as shown in step 744. If the user does provide feedback on the additional content, the form of the feedback is established, as shown in step 712, reached via line 746. The process ends with end step 750, reached via line 748.

Figure 8:
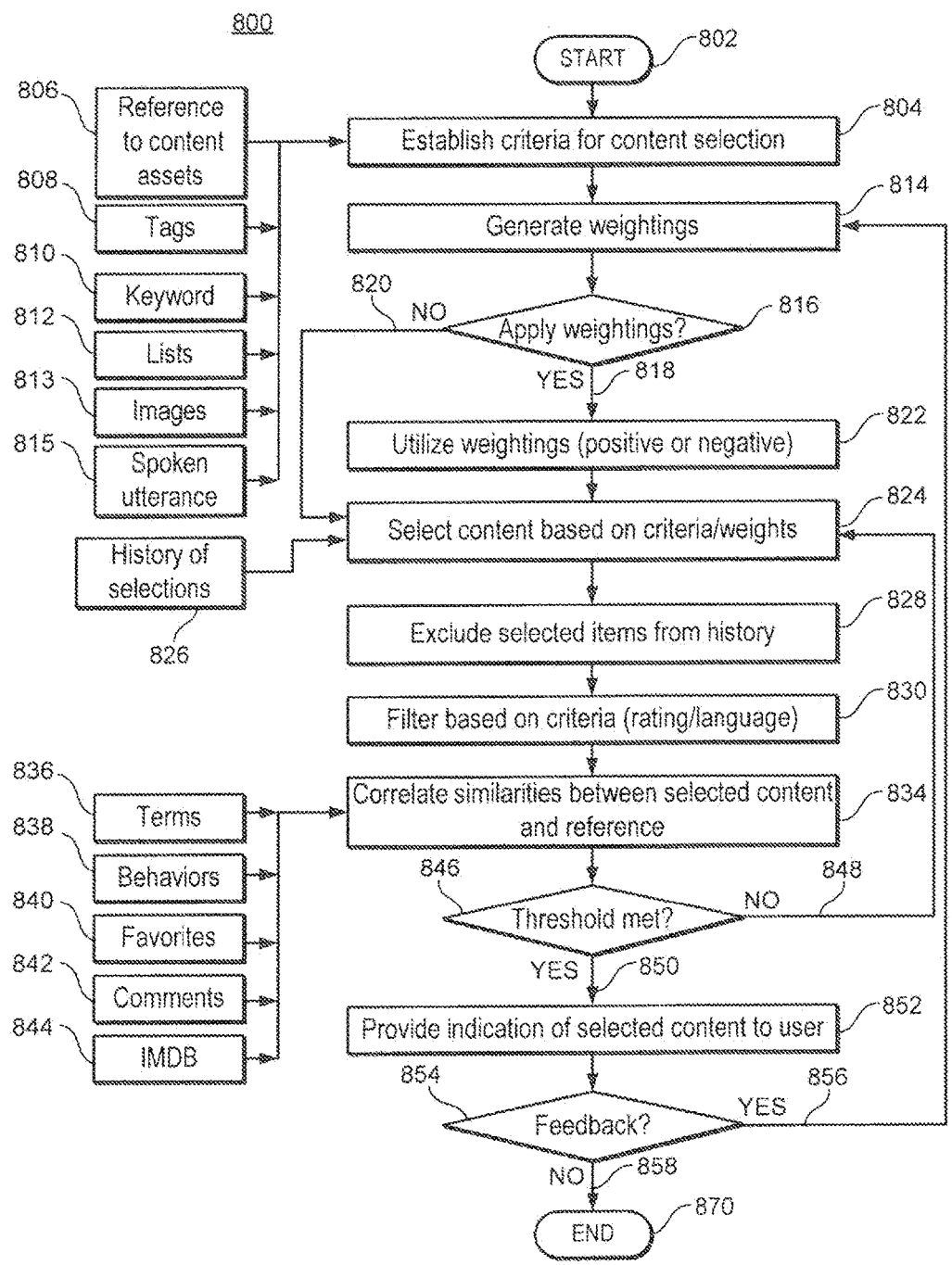
FIG. 8 illustrates a series of steps that can be used to share feedback and display content channels according to yet another embodiment of the present invention.

FIG. 8 illustrates a series of steps 800 that can be used to share feedback and display content channels according to yet another embodiment of the present invention. The steps 800 may be stored on a suitable electronic storage medium, such as a computer-readable medium, which may be non-transitory, or transitory, such as RAM. The steps 800 may be object code, source code, or stored on a dedicated storage medium, either local to the user device (FIG. 1, device 112) or at a remote location, (FIG. 1, server 104) and accessed as desired. Thus the steps 800 may be considered a module when stored and/or accessed and/or retrieved, regardless of the type of storage medium.

The process 800 begins, as shown in start step 802. A set of criteria is established to choose content selections that are similar to the criteria, as shown in step 804. The criteria may include references to content assets (806) and tags (808) or keywords (810) or lists (812), or images (813) or spoken utterance (815). Weighting are generated based on the criteria, as shown in step 814. The weightings may be positive (favorable) or negative (unfavorable). The weightings may be applied to the content, as shown in step 816. If the weightings are applied, they are used, as shown in step 822, reached via line 818, to either positively or negatively influence the content selection.

Content is selected based on the available information, such as criteria and/or weightings, as shown in step 824. The selection step (824) is reached whether the weightings are applied or not (line 820). The history of selections may also be used (826) in the selection of content.

Additionally, the selection process can avoid selecting content from a list. One list of content to avoid when making the selections will be based on the history of the content chosen for the content channel already, as shown in step 828. The items from the history that are not repeated can include the whole history list, the last "n" items (where "n" is any suitable number), all items played in the last "n" minutes, any items not flagged as repeatable by the user, or any combination of those factors. Thus, the system described herein can generate a repetition criteria, which is criteria used to determine repeated access to one or more content assets. For example, the access to content assets can result in generation of a history list based on content assets that have been accessed. Content assets of the history may be selectively excluded from subsequent access based on pre-determined repetition criteria. Another list that may be avoided is the content that was used for the seeds of the list. For example, if a content channel is being viewed by a user, other than the creator of the content channel, then the seed content might be good choices, but any seed with a negative weighting should not be selected.

Filters can be applied based on criteria and/or weightings, as shown in step 830. This filtering may be used to prevent certain content from being chosen. One example is filtering by a setting for content ratings, which would prevent content with certain ratings from being chosen.

Any suitable algorithm may be used to determine the similarity between each piece of content being considered as a choice for a content channel and each content reference in the settings for that content channel and/or the keywords in the channel's settings, as shown in step 834. This correlation may include, for example, the extraction of terms and phrases from the meta-data about pieces of content (836), comparing user behavior towards multiple pieces of content to find patterns of similarity (838). This user behavior may also include activities such as choices made for viewing and purchase, user ratings, the addition of content to lists such as favorites (840) or content channel seed lists and comments (842) made in reference to content and/of IMDB (Internet Movie Data Base) (844).

Each time two pieces of content are added to the same list they can be considered more similar to each other. This could be a user's favorites list or a seed list for a content channel. For a seed list for a content channel, the degree to which they are considered to be more similar can be determined by the similarity of the weightings they are given. If one has a positive weighting and the other has a negative weighting, they can be considered less similar. Furthermore, information about who is viewing a content channel may be taken into account when choosing items for the content channel for that viewer. This includes things such as other content the user has chosen to view, content ratings made by the user, and preferences, such as genre flags, indicated by the user. This may result in two different users seeing different content when viewing the same content channel. For example, when considering a user identity, or user profile, associated with a user device, content that has already been viewed by that user can be eliminated from the choices made by the content channel so that the viewer will only see content for the channel that has not been previously provided. Thus, a user will constantly be provided with new content.

A determination is made whether the selected content is suitable to be added to the content channel. This is typically achieved by determining whether a predetermined threshold is met, as shown in step 846. If the content is not deemed an appropriate match, other content is selected, as shown in step 824, via line 848. If the selected content is deemed appropriate content for the content channel, the content, or an indication of the content (title) may be provided to the user, as shown in step 852, reached via line 850. The providing step may also include storing the content in memory, placing the content in a queue, indicating the content may be accessed by the user, and/or directly providing the content to a user device, typically via a user interface.

If the user wishes to provide feedback, as shown in step 854, a weighting can be generated, as shown in step 814, via line 856. If the user does not wish to provide feedback, the process 800 ends, as shown in step 870, reached via line 858.

It is also an embodiment of the present invention that the system may obtain external meta-data from third parties about content, such as from IMDB or Gracenote™, when determining the correlation between a piece of content and the selection criteria (834). This could be for the content being considered for selection of for the content being used as the selection criteria. Furthermore, depending on the settings of the channel, the items used as seeds for the channel may be good choices for content in that channel, or should be considered as not available for choices for that channel.

It is yet another embodiment of the present invention that if items in the history for a content channel (826) are available to be selected again after a certain number of choices of other content or a certain amount of time has elapsed, some randomization of the content may be applied to ensure that the same series of content from the history is not picked again in the same order as those content selections become eligible again.

Figure 9A:
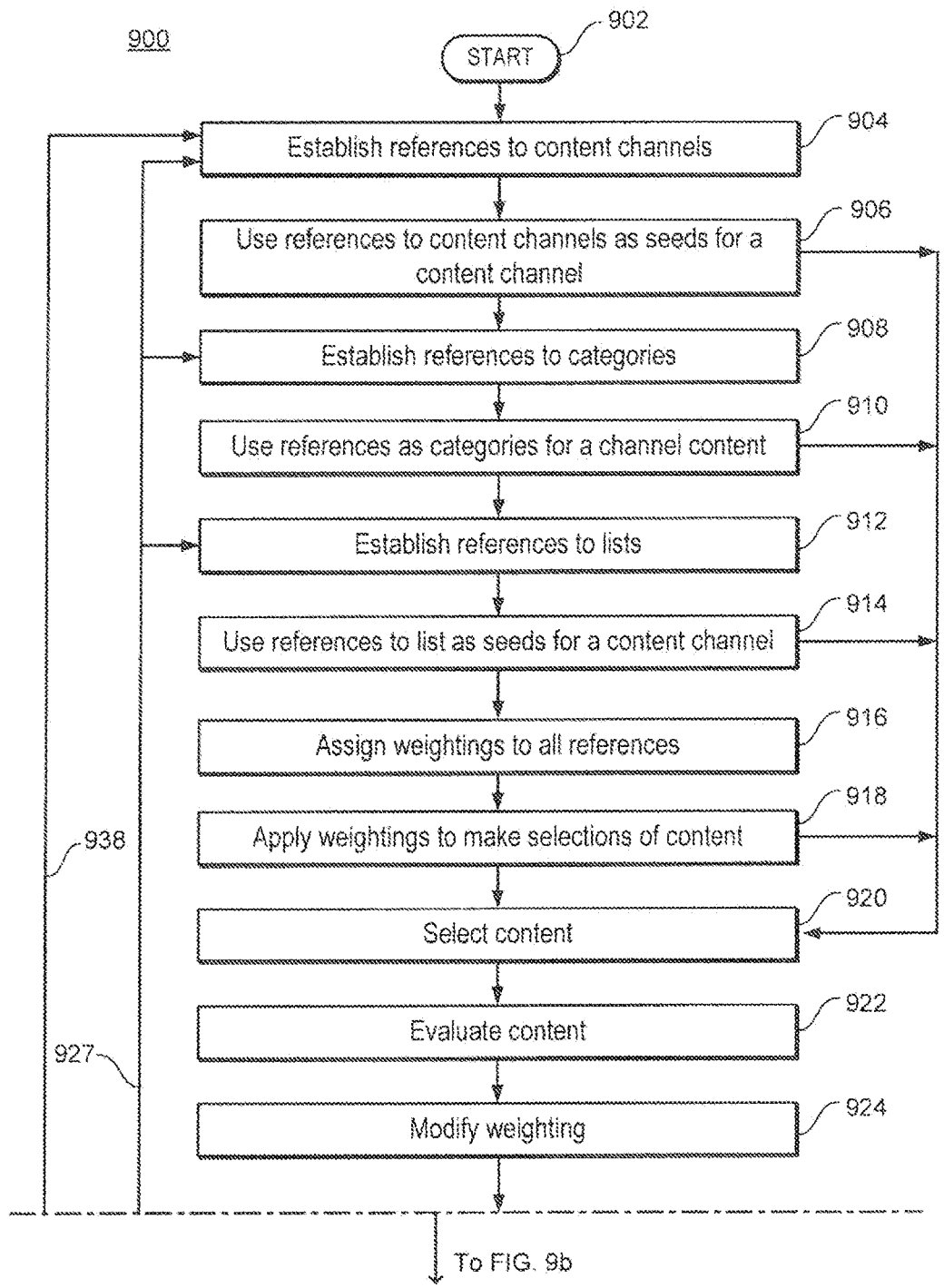
FIG. 9 illustrates a series of steps that can be used to establish and manipulate content channels according to yet another embodiment of the present invention.
Figure 9B:
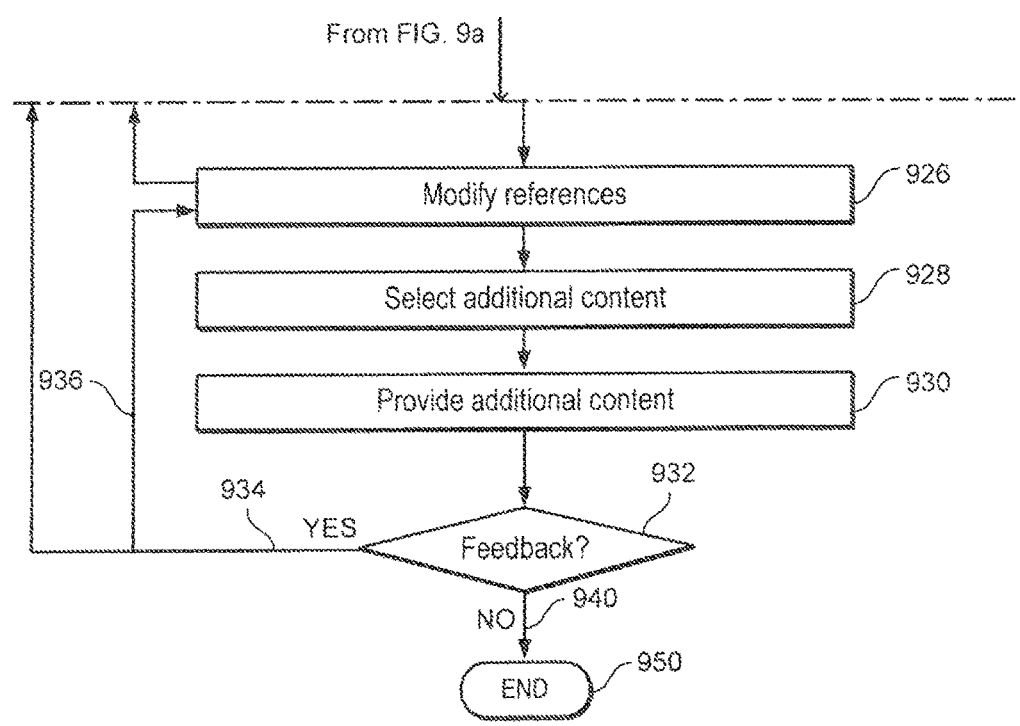

FIG. 9 illustrates a series of steps that can be used to establish and manipulate content channels according to yet another embodiment of the present invention. The steps 900 may be stored on a suitable electronic storage medium, such as a computer-readable medium, which may be non-transitory, or transitory, such as RAM. The steps 900 may be object code, source code, or stored on a dedicated storage medium, either local to the user device (FIG. 1, device 112) or at a remote location, (FIG. 1, server 104) and accessed as desired. Thus the steps 900 may be considered a module when stored and/or accessed and/or retrieved, regardless of the type of storage medium.

The process 900 begins, as shown in start step 902. References for a content channel are established, as shown in step 904. The references to content channels may be used as seeds for a content channel, as shown in step 906. References to categories may be established, as shown in step 908 and these references to categories in a service or provider may be used as seeds in a content channel, as shown in step 910.

References to lists, such as a user's favorites, to be used as seeds in a content channel are established, as shown in step 912. These references to lists may be used as seeds for a content channel, as shown in step 914. The seeds may derive from tags and/or keywords, and/or references to content items and/or lists and/or other content channels and/or categories.

A weighting may be assigned to all references, as shown in step 916 and these weightings may be applied in the selection of content for the content channel, as shown in step 918. The weighting of the seeds may be equal in the selecting step.

Alternatively, the weighting of the seeds may be based on the type of seed, origination of the seed, whether the seed is referenced as a seed in a content channel, or other criteria. Favorably or heavily weighted tags are more influential in the selecting step than lesser content weighted seeds. It is also an embodiment that the content channel is excluded as a reference to the content channel.

Content is selected, as shown in step 920. The selection may be based on seeds (906), categories (910), lists (914) and/or weightings (918). As stated previously, typically the seeds for a content channel are treated in an equivalent manner whether the seeds are tags or keywords or references to content items, lists, content channels, or categories. Indeed, a content channel may have multiple lists of seeds of each type, with an overall weighting applied to the whole list of seeds. The content is evaluated, as shown in step 922 to determine how well the content selected (920) matches the seeds, categories, lists and/or weightings.

The weighting may be modified, as shown in step 924 and the references may also be modified, based on the modified weighting, as shown in step 926. Once the references are modified, the steps of establishing references to content (904), establishing references to categories (908) and establishing references to lists (914) may be reached, as shown by line 927. Thus, as a referenced list, category, or content channel changes, its influence on the content chosen for a content channel using it as a seed will change. The influence of seeds in a content channel that is referenced as a seed in a content channel should be weighted based on the weighting of the content channel reference.

The seed should have less influence on the content channel that references the channel it is defined in than it does on the channel it is defined in. For example, one embodiment is that there is a limit on the number of levels of content channel references that can be used. By treating content channels and individual content selections equally it allows a mixture of assets and channels to be included in the same list, such as the results of a search, a category in a service, or the user's favorites. Users could also create a list of their favorite content channels.

Additional content may be selected, as shown in step 928 and may be provided to a user, as shown in step 930, either by storing the content in memory, placing the content in a queue, indicating the content may be accessed by the user, and/or directly providing the content to a user device, typically via a user interface.

If the user wishes to provide feedback, as shown in step 932, the reference to content may be modified, as shown in step 904, via line 934/938. Also, the references may be modified as shown by line 934/936 leading to modification step 926. If the user does not wish to provide feedback, the process 900 ends, as shown in step 950, reached by line 940.

Figure 10B:
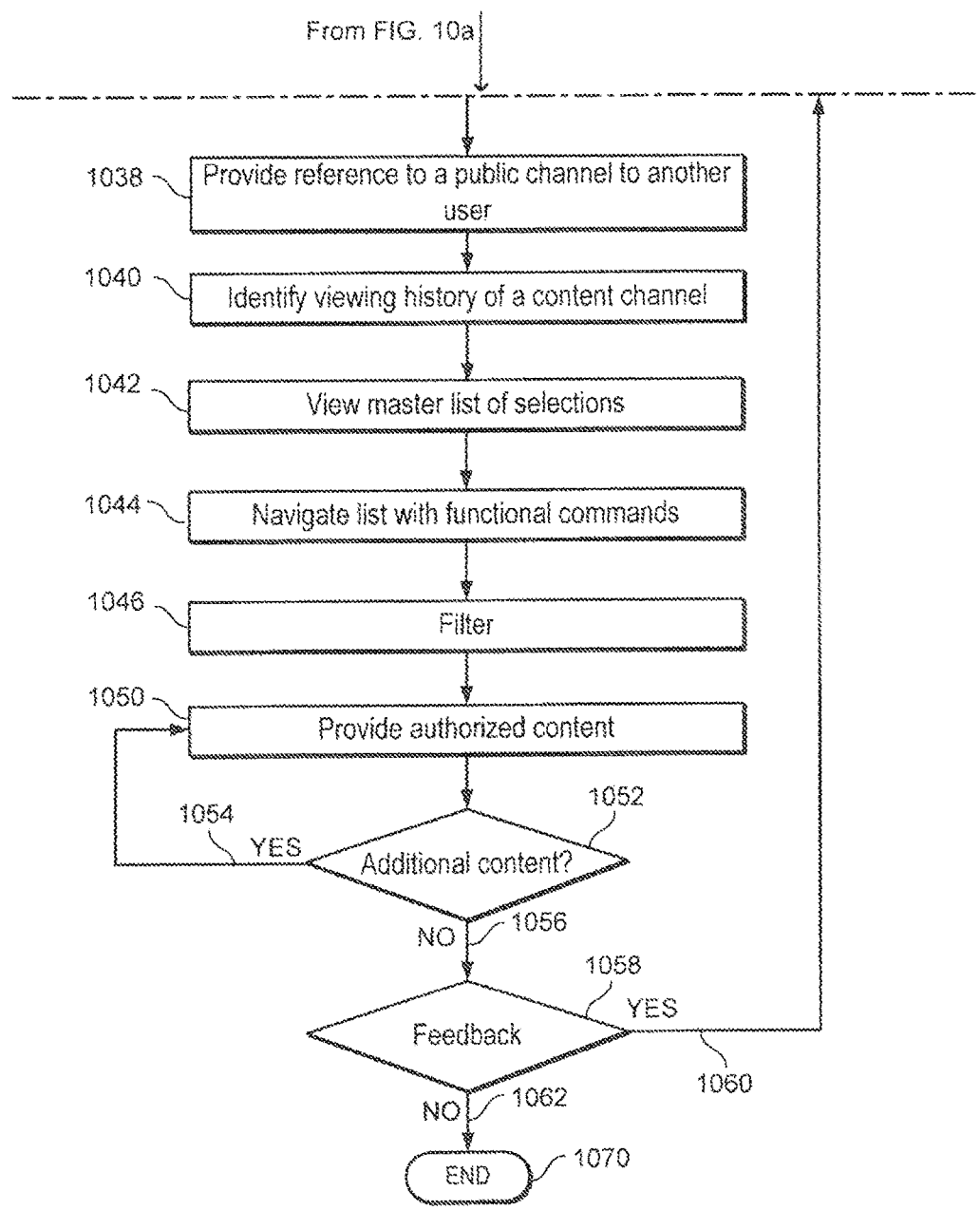
FIG. 10 illustrates a series of steps that can be used to share content channels among users according to yet another embodiment of the present invention.

FIG. 10 illustrates a series of steps 1000 that can be used to share content channels among users according to yet another embodiment of the present invention. The steps 1000 may be stored on a suitable electronic storage medium, such as a computer-readable medium, which may be non-transitory, or transitory, such as RAM. The steps 1000 may be object code, source code, or stored on a dedicated storage medium, either local to the user device (FIG. 1, device 112) or at a remote location, (FIG. 1, server 104) and accessed as desired. Thus the steps 1000 may be considered a module when stored and/or accessed and/or retrieved, regardless of the type of storage medium.

The process 1000 begins, as shown in start step 1002. Criteria for a content channel are established, as shown in step 1004. The criteria can include meta-data about the content channel, such as title, description, key words, category classification or other data that can facilitate searches or navigation of publicly available content channels. Content, which matches the criteria, is acquired for the content channel, as shown in step 1006. Thus, the content channel may be directed to a particular type of content asset.

A user may establish one or more privacy settings for a content channel that they created, as shown in step 1008. The privacy settings may include making the channel available to the public. The settings, which are set by the creator of the content channel, may also be more restrictive and share access to the content channel only with users who have an association established with their account, such as being set up as "friends". The settings may also make the user's content channel private so that the content channel is not accessible by any other user, or only pre-authorized other users who meet or exceed a minimum access authorization level. The settings may also make the content channel available only to other users that are explicitly identified and/or listed.

The method 1000 can have special users that create and share content channels that are made available to users, which includes establishing criteria to share content channels, as shown in step 1010. These criteria can include things like content channels for certain content based on features. The features may include, for example, certain genres (1012), editor's picks (1014), actors (1016), directors (1018), and/or editors (1020).

A user may establish blocking to prevent certain other users from accessing their content channel, as shown in step 1022. As part of the blocking, if a user makes their content channel available to the public, they may create a blocked list of users that may not access that content channel.

If more than one user plays the same content channel, as shown in step 1024, then a separate history can be maintained for each user's playback of the content channel, as shown in step 1030, reached via line 1028. Alternatively, there may only be a single user, as shown by line 1026 reaching step 1032.

Furthermore, it is also an embodiment of the present invention, that if more than one user plays the same content channel, then the content channel may have a single history, with each user maintaining an associated offset into that history. A new user viewing a content channel would start with the first item in the channel's history and navigate through the selections in the history that were previously made for that channel. Furthermore, duplicate selections may be deleted to enhance efficiency of the content channel. Also, selections made for a content channel will be skipped for a user who can not play the particular selection, either due to rating limits, authorizations, device capabilities, inadequate electronic funds to purchase the content or other technical, financial or user restrictions.

Application of the matching criteria for a content channel, as shown in step 1032 can execute a search, as shown in step 1034, which can identify and/or locate other content and/or content channels, based on seed tracking that are usable by the user and are a satisfactory match to the search criteria entered by the user, as shown in step 1036. There can be global lists of content channels that are publicly shared. These can be organized by different factors, such as creation date, title, or keyword. A user may follow the seeds of a content channel to see a list of other content channels that are usable by them that contain the same seed. This seed can be any type of key, including a keyword or reference to a content selection or list. These other channels can be ordered by the weighting for that seed within the channel.

It is also an embodiment of the present invention that a user may obtain a list of related channels, which would include channels that have seeds in common with the current channel. Also, two content channels can be considered to be more closely related based on the commonality of content selections. That is, the more content selections two content channels have made in common, the more closely related.

Users may provide a reference to a public channel to another user, as shown in step 1038. The user may also send a reference to a content selection, list, or category to another user.

The owner of a content channel may identify and/or view the history lists of selections made for one or more of the content channels originated by the user for other users, as shown in step 1040. The owner of a content channel may also see, or view, a master history list of selections made for that content channel, as shown by step 1042. This list would be de-duplicated and could be ordered chronologically by when the selection was first made, or by the number of users for which that selection was made.

A user may navigate through the content for a content channel, as shown in step 1044. For example, selections that are not playable by a user may be skipped during playback. These selections could be visible in lists and usable as seeds in content channels owned by the user. There can also be an option to filter out selections that are not accessible, either due to device restrictions or user-qualifications, when viewing a list, as shown by step 1046. A status identifier may be generated based on the content assets, devices and/or users. Sorting, or filtering may be performed based on the status identifier.

Following any desired filtering, authorized content is provided to a user, as shown in step 1050. The provision of content to a user may include, for example, storing the content in memory, placing the content in a queue, indicating the content may be accessed by the user, and/or directly providing the content to a user device, typically via a user interface.

If additional content is available, a determination is made whether to provide the additional content, as shown in step 1052. If so, the content is provided, as shown in step 1050 and line 1054. If there is no additional content or the user does not wish to access additional content, a feedback determination step 1058 is reached, via line 1056.

If the user wishes to provide feedback, as shown in step 1058, the feedback may be used as criteria for a content channel, as shown in step 1004, via line 1060. If the user does not wish to provide feedback, the process 1000 ends, as shown in step 1070, reached via line 1062.

Similar to embodiments in which content channels may have separate history lists, or a common history list, feedback from each user may be maintained separately for each user or could be added to a common feedback list to influence selections made for other users. The set of users authorized to add feedback to the common list may be restricted by the owner of the content channel.

FIG. 11 shows a series of steps 1100 that can be used to modify shared content channels according to yet another embodiment of the present invention. The steps 1100 may be stored on a suitable electronic storage medium, such as a computer-readable medium, which may be non-transitory, or transitory, such as RAM. The steps 1100 may be object code, source code, or stored on a dedicated storage medium, either local to the user device (FIG. 1, device 112) or at a remote location, (FIG. 1, server 104) and accessed as desired. Thus the steps 1100 may be considered a module when stored and/or accessed and/or retrieved, regardless of the type of storage medium.

The process 1100 begins, as shown in start step 1102. Criteria for a content channel are established, as shown in step 1104. Content, which matches the criteria, is acquired for the content channel and provided to the user, as shown in step 1106.

A determination is made whether the content has been previously accessed by the user, as shown in step 1108. For example, when a viewer accesses/listens to and/or watches a content channel, the content that is selected for that user can exclude any content that the user has already accessed, as shown in step 1114, via line 1112. Furthermore, if the content has not been accessed, it is provided to the user, as shown in step 1118, via line 1116. Furthermore, content may be excluded if the user has previously viewed the content by another means other than a content channel, such as viewing the content through the results of a search. For example, if a user viewed a movie in a movie theater, that content can be excluded from the relevant content channel.

A user can also be given the option to see the content chosen for the content channel unmodified by their viewing history. This is useful in embodiments such as replaying a content channel to see the same content again, such as to show the content to another user.

When a user would like to modify the settings of a content channel they are using that they did not create, a new content channel can be created that references the other user's content channel, as shown in step 1120. Any changes that the user makes to their new content channel can then be applied as a mask to the referenced base content channel. This will allow a user to customize the content selected when they use a channel without affecting other user's use of the channel, as shown in step 1122.

Additional content is identified based on the first user, or creator's selections, as shown in step 1124. This additional content is provided as part of the content channel, as shown in step 1126. There may also be a separate history list for each combination of content channel and viewer. Thus, when a viewer other than the owner gives feedback about the fitness of a selection for a content channel, the feedback can be stored in a separate list that is specific to the combination of content channel and viewer.

The aggregation of feedback of all the users with respect to the seed lists may be used when choosing content for a channel. The influence of feedback made by different users may be weighted differently, as shown in step 1128. For example feedback from the content channel's friends may be weighted higher than feedback from other users.

It is also an embodiment of the present invention that the owner of a content channel may allow modifications of the content channel by others, as shown in step 1130. The privacy settings for which users can modify a channel are typically different than those for who may access a content channel. Also, the modifications may be stored in a mask, as shown in step 1131, reached via line 1135. If the channel is not modified, content is provided to a user, as shown in step 1140, reached via line 1133.

Changes to a content channel by users other than the channel's owner may be weighted differently than the seeds set up by the owner. The owner of the content channel should be able to control these weightings, as shown in step 1132.

Indeed, another embodiment of the present invention is that a user who makes a modification to a content channel can be identified, as shown in step 1134, reached via line 1135. A user who modifies a content channel may also have an authorization level, which depends on how much influence the user will have on the modification of the content channel. For example, a user with a high authorization level can have more influence in the channels modification than a user with a low level of authorization. The authorization can be a number or other identifier associated with a user when the user logs on or accesses a content channel.

The content channel can be additionally modified, as shown in step 1136, which may be reached from step 1132 and/or step 1134, as described herein and changes made to a content channel by users other than the channel's owner may be kept separate and treated as a mask that users of the channel may turn on and off as they use the channel.

The content channel may then be made available to other users, as shown in step 1140. The content channel may also be used as a seed to establish another content channel, as shown in step 1104, via line 1142.

The process 1100 ends, as shown by end step 1150.

FIG. 12 shows a series of steps 1200 that can be used to clone content channels according to yet another embodiment of the present invention. The steps 1200 may be stored on a suitable electronic storage medium, such as a computer-readable medium, which may be non-transitory, or transitory, such as RAM. The steps 1200 may be object code, source code, or stored on a dedicated storage medium, either local to the user device (FIG. 1, device 112) or at a remote location, (FIG. 1, server 104) and accessed as desired. Thus the steps 1200 may be considered a module when stored and/or accessed and/or retrieved, regardless of the type of storage medium.

The process 1200 begins, as shown in start step 1202. Seed references for a content channel are established, as shown in step 1204. A first content channel is established, as shown in step 1206. The first content channel is based on the seed references.

The first content channel may be cloned, or copied or duplicated, to generate a second content channel, as shown in step 1208. The cloned content channel includes the properties of the first content channel from which it derived. For example, if a user wishes to create a new content channel, the user may start by cloning another content channel. The user will then have a content channel that is seeded the same as the source channel. The user can then modify the seeds to their new content channel, including adding or deleting seeds or modifying the weighting of seeds.

The seeds for a cloned content channel (second content channel) may include references to content that the owner does not have access to and would not otherwise have been able to select as a seed. The second content channel may be modified, as shown in step 1210. If a content channel being cloned (first content channel) has a reference to a list that the clone's owner does not have access to see, the clone may keep that reference so that any changes to the list are still reflected, as shown in step 1214. The clone may also create a new seed list with references to content included in the list. (There may be security concerns with cloning the references in the list as that would expose content in the list that the clone owner would not otherwise know about.)

The cloned content channel (second content channel) may be provided to a user, as shown in step 1216. The providing of the content channel may include, providing a list of a content assets, or other identifying information that identifies a content asset such that a user can decide whether they wish to obtain more information about the content asset. The user may wish to provide feedback to the content assets identified in the content channel, as shown in step 1218. If the user provides feedback, the feedback is used to establish seed references for a new first content channel, as shown in step 1204, reached via line 1220.

If the user does not wish to provide feedback, a weighting tag may be applied to the cloned content channel (second content channel), as shown in step 1226, reached via line 1222. The cloned content channel may then be modified, based on the weightings, as shown in step 1228. Also, a user, or creator of a cloned content channel may establish privacy rights for themselves or other users of the content channel. These privacy rights determine who is allowed to modify the seed list of the content channel and/or the right to clone the content channel.

The modified cloned content channel may then be provided to one or more users, as shown in step 1230.

The process 1200 ends, as shown by end step 1240.

Another embodiment of the present invention includes an owner of a list changing the privileges of the list so that a content channel owner no longer has permission to view that list. The list could be cloned at that point into a seed list in the content channel and the reference to the original list removed. A cloned channel typically has the same criteria for picking content that the source channel did.

Figure 13:
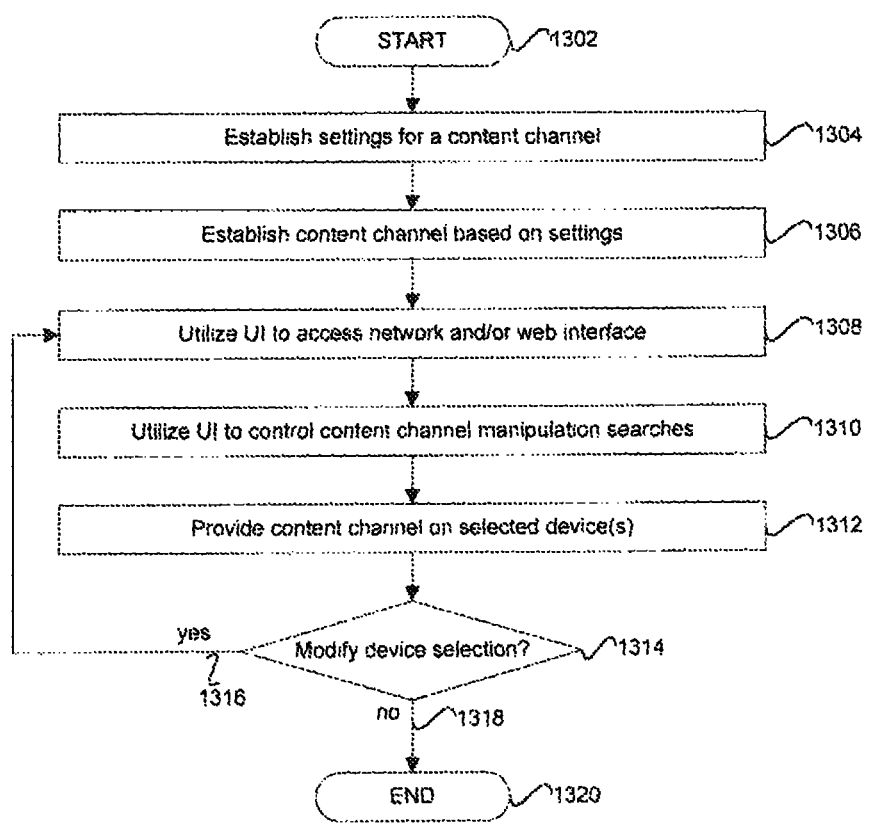
FIG. 13 shows a series of steps that use a user interface to implement embodiments of the present invention.

FIG. 13 shows a series of steps 1300 that use a user interface to implement embodiments of the present invention. The steps 1300 may be stored on a suitable electronic storage medium, such as a computer-readable medium, which may be non-transitory, or transitory, such as RAM. The steps 1300 may be object code, source code, or stored on a dedicated storage medium, either local to the user device (FIG. 1, device 112) or at a remote location, (FIG. 1, server 104) and accessed as desired. Thus the steps 1300 may be considered a module when stored and/or accessed and/or retrieved, regardless of the type of storage medium.

The process 1300 begins, as shown in start step 1302. Seed references or settings for a content channel are established, as shown in step 1304. A first content channel is established, as shown in step 1306, based on the seeds and/or settings.

A user interface (UI) may be utilized to access a network and/or web interface by a user to access a content channel, as shown in step 1308. Indeed, to maintain the simplicity of a device that uses content channels, access to and control of the details of a channel's settings can be managed through a web interface to keep the device's interface simple and clean, as shown in step 1310. The UI of some devices is limited, thus making the management of minute details difficult on those devices. A web interface permits an easier to use alternative to managing the details of content channels. For example, typing on a computer keyboard is easier than typing with a TV remote control. Also, some devices have limited character sets that a user can type with that device, while a web interface can allow any Unicode character to be entered.

Furthermore, use of a UI permits normal web navigation to be used in the maintenance of content channels. Searches of content on the network may be performed through a web interface, which allows for easier entering of search criteria. The user can have results they like added to a list for easy viewing with their device. The content may be provided to a user utilizing one or more user devices, as shown in step 1312. Another embodiment of the present invention is that a web interface may be displayed in a browser on a device that has a pointer, such as a mouse, for a device that does not have a pointer. This allows a different style of interface to be provided that the user might find more convenient or easier to use. For example, content can be re-ordered using a "drag-and-drop" technique.

The device used to display or output the content may be changed, as shown in step 1314. If the user device is changed, the provision of content (step 1312) utilizes one or more other user devices, as shown by line 1316. The "on", or operable device UI can concentrate on simplicity while the web interface can be optimized for managing the details of the content channels. Additionally, a device with a web browser can allow the user to use the web interface on-device to manage their content channel details, while still maintaining a simple interface for navigating and playing content channels. Otherwise, the process 1300 ends, as shown by end step 1320, via line 1318.

Figure 14:
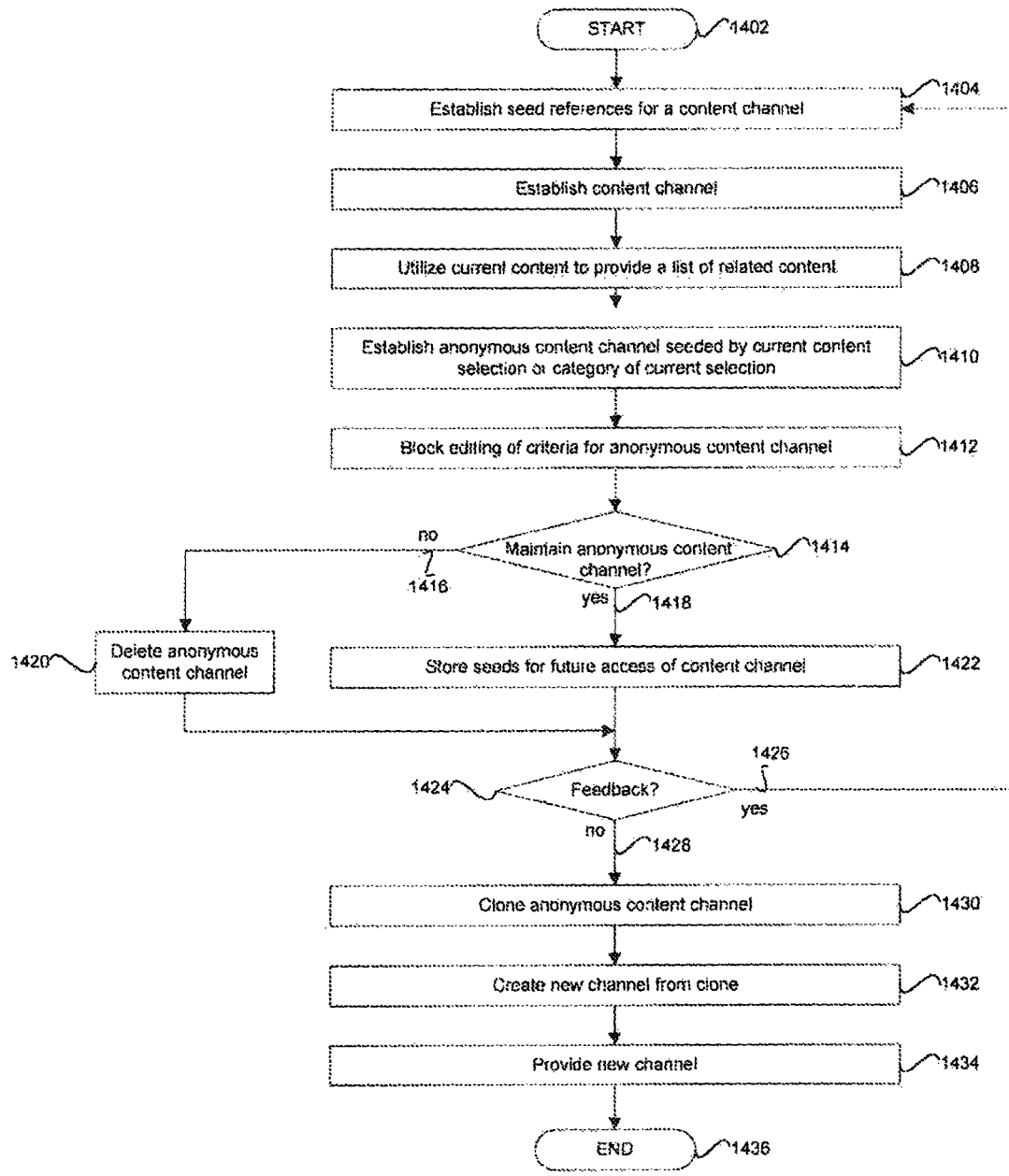
FIG. 14 shows a series of steps that can be used to manipulate an anonymous content channel according to yet another embodiment of the present invention.

FIG. 14 shows a series of steps 1400 that can be used to manipulate an anonymous content channel according to yet another embodiment of the present invention. The steps 1400 may be stored on a suitable electronic storage medium, such as a computer-readable medium, which may be non-transitory, or transitory, such as RAM. The steps 1400 may be object code, source code, or stored on a dedicated storage medium, either local to the user device (FIG. 1, device 112) or at a remote location, (FIG. 1, server 104) and accessed as desired. Thus the steps 1400 may be considered a module when stored and/or accessed and/or retrieved, regardless of the type of storage medium.

The process 1400 begins, as shown in start step 1402. Seed references for a content channel are established, as shown in step 1404. A first content channel is established, as shown in step 1406. The first content channel is based on the seed references. The current content may be used to provide a list of related content, as shown in step 1408. The list of related content may then be used to generate a related content channel, as shown in step 1410. An example of a related content channel is an "anonymous content channel", which can be seeded by the current content to provide a list of related content. Thus, content channels can be created "on-the-fly" as needed by the system to provide various content selections to the user. These content channels are deemed "anonymous content channels".

A user may navigate to one or more anonymous content channels that are seeded by one or more current content selections or categories of a content selection (1410). For example, there can be a menu item to navigate to an anonymous content channel seeded by the current content selection, or the category of the current selection. This navigation may be done even if the current content selection is playing. The content assets of the anonymous content channel may be provided to the user. Previously accessed content assets may be excluded from the anonymous content channel.

Since the anonymous channel is typically not created by a viewer, or user who navigates to the channel, the user who navigates to such a channel will not be able to edit the criteria for the anonymous content channel, as shown in step 1412.

A determination may be made whether to maintain the anonymous content channel, as shown in step 1414. If the anonymous content channel is not maintained, the anonymous channel is deleted, as shown in step 1420, via line 1416. The anonymous content channel can be destroyed when the user navigates away from it.

Alternatively, the seeds of the anonymous content channel may be saved, or stored for future access of the anonymous content channel, as shown in step 1422, via line 1418. Thus, the anonymous content channel stored or maintained in a storage location so that if the user navigates back to an anonymous content channel with the same seed(s), the content channel and/or seeds stored in history will be preserved, for future use. Furthermore, the seed content for an anonymous content channel may only be excluded from being selected for that channel if the user has already viewed it.

A viewer, or user, of a content channel may provide feedback related to fitness of content for a content channel for an anonymous content channel, as shown in determination step 1424. If the user provides feedback about the fitness of content selections for an anonymous content channel, the anonymous channel can be cloned to a new channel owned by the user that the feedback is then added to, or by establishing seed references for a content channel, as shown in step 1404, via line 1426.

If the user does not provide feedback, the user can clone an anonymous content channel, as shown in step 1430, reached via line 1428. The user may also create a new named content channel from a clone of an anonymous content channel they are viewing, as shown in step 1432.

The new content channel from the clone may be provided to the user, as shown in step 1434. The provision of content to a user may include, for example, storing the content in memory, placing the content in a queue, indicating the content may be accessed by the user, and/or directly providing the content to a user device, typically via a user interface:

The process ends, as shown in step 1436.

Figure 15:
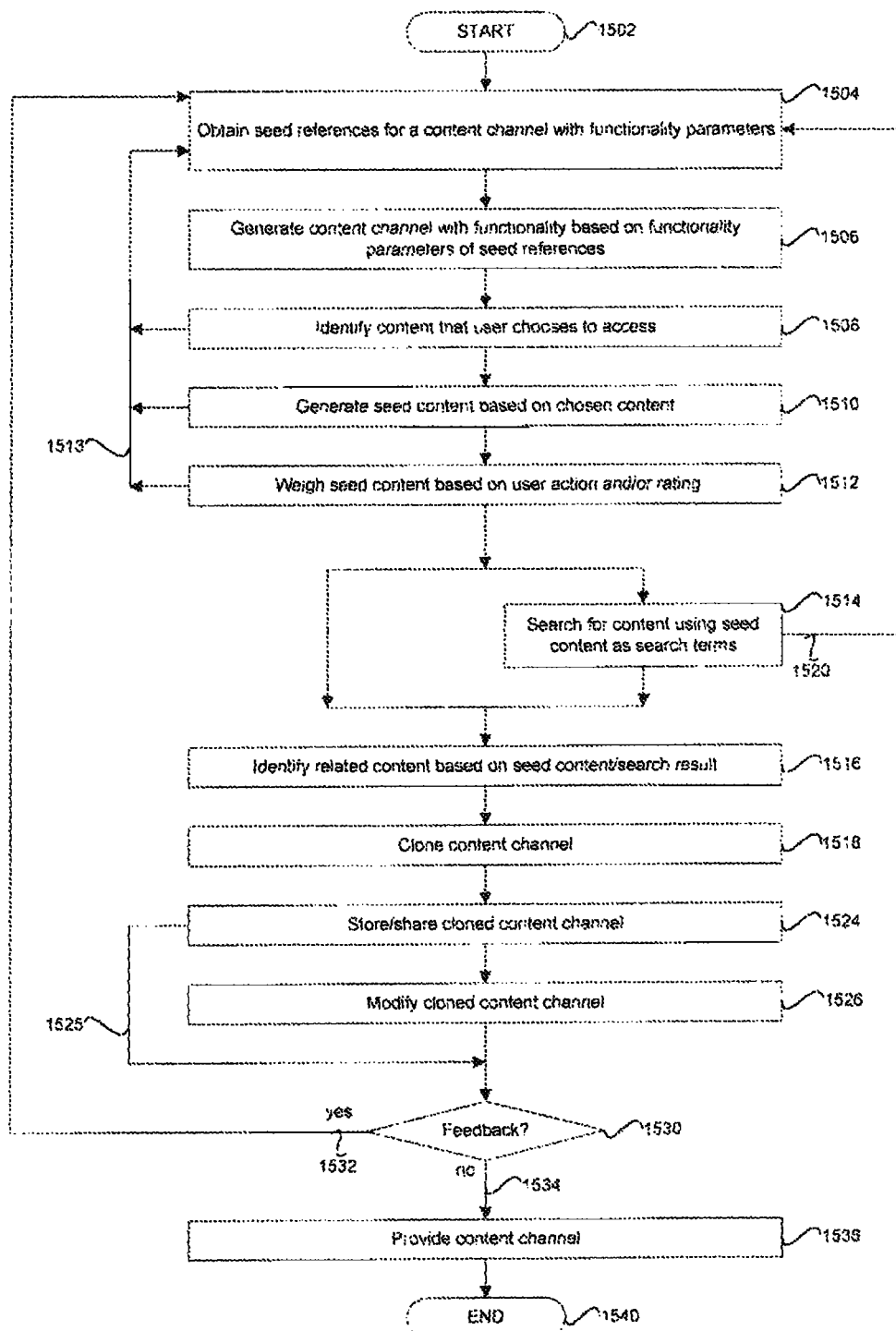
FIG. 15 shows a series of steps that can be used to modify content channels according to yet another embodiment of the present invention.

FIG. 15 shows a series of steps 1500 that can be used to modify content channels according to yet another embodiment of the present invention. The steps 1500 may be stored on a suitable electronic storage medium, such as a computer-readable medium, which may be non-transitory, or transitory, such as RAM. The steps 1500 may be object code, source code, or stored on a dedicated storage medium, either local to the user device (FIG. 1, device 112) or at a remote location, (FIG. 1, server 104) and accessed as desired. Thus the steps 1500 may be considered a module when stored and/or accessed and/or retrieved, regardless of the type of storage medium.

The process 1500 begins, as shown in start step 1502. Seed references for a content channel are obtained, with functionality parameters, as shown in step 1504. Certain standard functionality can be accomplished by creating a content channel with seed criteria designed for the functionality and allowing the system to use the same content channel mechanism to choose the content of interest and allow the user to navigate and/or access the content assets.

One or more content channels are generated based on functionality parameters of the seed references, as shown in step 1506. Special content channels can be created "on-the-fly" as anonymous content channels as needed, or they may be pre-built for the user as a standard channel. Content that a user chooses to access is identified, as shown in step 1508, and seed content based on the chosen content can be generated based on the chosen content, as shown in step 1510.

In an embodiment in which an anonymous content channel provides recommendations tailored for a user, the seed content may be weighed based on user action and/or a user rating, as shown in step 1512. Some or all of the identification of content (1508), generation of seed content (1510) and weighing of seed content, can be used to obtain seed references (1504) as shown by line 1513. The weighing may also be used to rank the associated content asset. Recommendations can be accomplished by choosing content that the user has previously chosen to view as seed content. This can be further enhanced with other information about the user's activity, such as creating seed weighted more heavily based on ratings the user may have made. Furthermore, it is an embodiment of the present invention that when a content channel that was created for recommendations can be maintained between uses so the user can continue navigating from the point where the user left off in the content channel choices instead of starting from the beginning of the choices made by the recommendations channel.

A search for content may be performed that uses seed content as search terms and/or user input, as shown in step 1514. The search results may be used to obtain seed references (1504), as shown by line 1520. Search results can be accomplished by seeding a content channel with the user's search terms and/or any weighting associated with the search terms.

Related content may be identified based on the seed content and/or search results, as shown in step 1516. Related content can be accomplished through a content channel seeded with the base content or category. Special content channels may have hidden settings that the users would not see. The content channel may be cloned, as shown in step 1518. The cloned content channel may be stored in a memory and/or shared with other user, as shown in step 1524. Furthermore, the cloned channel may be modified, as shown in step 1526. Also, the content channel may be deemed restricted, which prohibits modification of the content channel. The modification of a content channel may be controlled based on an authorization level of a user who wishes to modify the content channel.

A viewer, or user, of a content channel may provide feedback related to fitness of content for a content channel, as shown in determination step 1530, which may be reached from the store/share step 1524, via line 1525. Providing feedback on the fitness of selections for a content channel used for performing a search can be used as a method of further refining the search. This is useful since the user does not need to modify search terms to refine the search. Having a static standard content channel for recommendations allows the user to give effective feedback on the fitness of the content selections made as recommendations. This feedback would then be stored in the standard content channel to influence future recommendations. If the user provides feedback about the fitness of content, selections for a content channel, the feed back may be used to obtain seed references, as shown in step 1504, via line 1532.

If the user does not provide feedback the content channel may be provided to the user, as shown in step 1536, reached via line 1534. The provision of content to a user may include, for example, storing the content in memory, placing the content in a queue, indicating the content may be accessed by the user, and/or directly providing the content to a user device, typically via a user interface.

The process ends, as shown in step 1540.

Other various embodiments will now be described, as shown on the various figures herein.

One embodiment of the present invention is directed to a method of generating a content channel that includes accessing a list of content assets, utilizing one or more content assets as settings for the content channel, and selecting additional content assets. The selection is based on the settings. The content channel is generated based on the additional content assets.

Another embodiment of the present invention is directed to the method described above and also includes modifying the settings based on user input.

Yet another embodiment of the present invention is directed to the method described above and also includes navigating through the list of available content assets; and providing an indication of a start of a listing of additional content assets.

Yet another embodiment of the present invention is directed to the method described above and also includes providing an indication of an access status of a content asset.

Yet another embodiment of the present invention is directed to the method described above and also includes providing an indication of one or more content assets that are not available to the user. This may be due to content of the content asset, cost of the content asset or other restriction or prohibition.

Yet another embodiment of the present invention is directed to the method described above and also includes providing meta-data of content assets that are not available to the user.

Yet another embodiment of the present invention is directed to the method described above and also includes utilizing meta-data of unavailable content assets as settings for a second content channel.

Yet another embodiment of the present invention is directed to the method described above and also includes identifying a sequential order of the content assets. The content assets are provided as a function of the identified sequential order.

Yet another embodiment of the present invention is directed to the method described above and also includes identifying precedential content for the content assets. The content assets are provided based on the precedential content identifier. Thus, the appropriate sequence of the content asset(s) is preserved for the viewer.

Yet another embodiment of the present invention is directed to the method described above and further includes identifying meta-data related to a content channel seed; and utilizing the meta-data during selection of content. The meta-data includes information from the context in which the content channel seed was selected.

Yet another embodiment of the present invention is directed to the method described above and also includes providing a listing of content that is associated with a particular content channel; and sorting the listing of content based on user input.

Yet another embodiment of the present invention is directed to the method described above and also includes generating one or more seeds; and identifying additional content assets based on the seeds.

Yet another embodiment of the present invention is directed to the method described above and also includes providing additional content assets in a sequence that is based on the degree of matching between the additional content and the seeds and/or settings.

Yet another embodiment of the present invention is directed to the method described above and also includes providing additional content assets in a sequence that is based on user input.

Yet another embodiment of the present invention is directed to the method described above and further includes providing content selections in a random sequence.

Yet another embodiment of the present invention is directed to the method described above and also includes assigning a reproduction status identifier to each content asset.

Yet another embodiment of the present invention is directed to a content channel that includes generating one or more seeds, for the content channel. The seeds being a function of desired content and desired functionality. Content assets are selected from a pool of content assets based on the content assets of the pool and the one or more seeds. An indication of the selected one or more content assets is then presented to a user.

Yet another embodiment of the present invention is directed to the content channel described above wherein content assets are provided to a user device based on user input.

Yet another embodiment of the present invention is directed to the content channel described above and also includes navigating an indication of the selected content assets based on user input.

Yet another embodiment of the present invention is directed to the content channel described above and also includes utilizing content assets that have been accessed by a user to generate additional seeds.

Yet another embodiment of the present invention is directed to the content channel described above and also includes assigning a weight to the content assets based on user feedback and utilizing the weight to select other content assets.

Yet another embodiment of the present invention is directed to the content channel described above and also includes generating search criteria based on user input and utilizing the search criteria in the seed generating step.

Yet another embodiment of the present invention is directed to the content channel described above and also includes utilizing a results list for a search as a list of content assets to seed a second content channel.

Yet another embodiment of the present invention is directed to the content channel described above, wherein the selecting step also includes identifying one or more related content assets based on seeds from a second content channel.

Yet another embodiment of the present invention is directed to the content channel described above and also includes establishing the content channel as being a restricted content channel, providing content assets of the restricted content channel, and controlling modification of the seeds of the restricted content channel.

Yet another embodiment of the present invention is directed to the content channel described above and also includes replicating the content channel; and modifying the replicated content channel.

Yet another embodiment of the present invention is directed to the content channel described above and also includes replicating the content channel; and sharing the replicated content channel with other users.

Yet another embodiment of the present invention is directed to the content channel described above and also includes utilizing user feedback of selected content assets to generate additional seeds.

Yet another embodiment of the present invention is directed to the content channel described above and also includes generating other content channels based on the additional seeds.

Yet another embodiment of the present invention is directed to the content channel described above and also includes generating recommendations based on the additional seeds; selecting recommended content assets based on the recommendations; receiving additional user feedback of the recommended content assets; and modifying the recommendations based on the additional user feedback.

Yet another embodiment of the present invention is directed to a content channel that includes generating one or more seeds based on predetermined criteria; selecting one or more content assets from a pool of content assets based on the content assets of the pool and the one or more seeds; presenting an indication of the selected one or more content assets to a user; and associating one or more codes with the content channel indicating the predetermined criteria.

Yet another embodiment of the present invention is directed to the content channel described above, wherein the codes are not available to the user. This is for example, when the codes are hidden codes or codes that are part of the content channel without being viewable by a user of the content channel.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A computer-implemented method of generating a content channel comprising:

accessing a pool of content assets stored on non-transient storage media;

utilizing one or more content assets from the pool of content assets as settings for the content channel;

generating a first content list of the content channel based on the settings and providing thereof to a user, wherein the content channel has a plurality of content lists, each content list being assigned a weight indicating an influence of that content list on a selection of content assets for the content channel;

generating a history list for the content channel that includes content assets that have been accessed by the user, selectively excluding content assets in the history list from being included in the first content list according to a repetition criteria, and randomizing a sequence of content assets in the history list when that sequence of content assets is available again to be selected in the first content list;

wherein the step of generating the first content list further includes selecting additional content assets to be included in the first content list based on at least characteristics of content assets of content channels which have been accessed previously by the user;

assigning a black-out period to a specific content based on a selection of the user, wherein the black-out period prevents the specific content from being played to the user during a pre-determined period of time;

wherein each time a user makes a selection of a content asset to be played back in the content channel, the step of selecting the additional content assets selects more additional content assets to be included in the first content list and makes the content channel endless by continuously adding the more additional contents to the first content list; and updating the first content list of the content channel based on the settings and the additional content assets, wherein the step of selecting the additional content assets further includes using unavailable content assets as seeds to seek a plurality of additional content assets for the user, an unavailable content asset representing one that is unavailable to the user due to a rating of the content exceeding a permitted rating for the user.

2. The method as claimed in claim 1, further comprising: modifying the settings based on user input.

3. The method as claimed in claim 1, further comprising: navigating through a list of available content assets; and providing an indication of additional content assets.

4. The method as claimed in claim 1, further comprising: providing an indication of an access status of a content asset.

5. The method as claimed in claim 1, further comprising: providing an indication of one or more content assets that are not available to the user.

6. The method as claimed in claim 5, further comprising: providing meta-data of content assets that are not available to the user.

7. The method as claimed in claim 1, further comprising: identifying a sequential order of the content assets; and providing the content assets as a function of the identified sequential order.

8. The method as claimed in claim 7, wherein the identifying step further comprises:
identifying precedential content for the content assets, wherein precedential content being content necessary to understand other content; and
providing the content assets based on the precedential content.

9. The method as claimed in claim 8, wherein the precedential content includes one of chronological precedence and information precedence.

10. The method as claimed in claim 1, further comprising: identifying meta-data related to a content channel seed; and
utilizing the meta-data in the selecting step;
wherein the meta-data includes information from the context in which the content channel seed was selected.

11. The method as claimed in claim 1, further comprising: providing a listing of content that is associated with a particular content channel; and
sorting the listing of content based on user input.

12. The method as claimed in claim 1, further comprising: generating one or more seeds; and
identifying the additional content assets based on the seeds.

13. The method as claimed in claim 12, further comprising:
providing the additional content assets in a sequence that is based on the degree of matching between the additional content and the seeds and/or settings.

14. The method as claimed in claim 1, further comprising: providing the additional content assets in a sequence that is based on user input.

15. The method as claimed in claim 1, further comprising: providing the content selections in a random sequence.

16. The method as claimed in claim 1, further comprising: assigning a reproduction status identifier to each one or more content assets.

17. A method of creating a content channel comprising:
generating, on a processor, one or more seeds, for the content channel, the seeds being a function of desired content and desired functionality;
selecting one or more content assets, from a pool of content assets having at least characteristics of content assets of content channels which have been accessed previously, based on the content assets of the pool and the one or more seeds;
presenting a first content list of the selected one or more content assets to a user, wherein the content channel has a plurality of content lists, each content list being assigned a weight indicating an influence of that content list on a selection of content assets for the content channel;
selecting additional content assets based on user input after presentation of the content assets; and
generating a history list for the content channel that includes content assets that have been accessed by the user, selectively excluding content assets in the history list from the selecting steps according to a repetition criteria, and randomizing a sequence of content assets in the history list when that sequence of content assets is available again to be selected in the first content list;
assigning a black-out period to a specific content based on a selection of the user, wherein the black-out period prevents the specific content from being played to the user during a pre-determined period of time; and
updating the content channel based on the selected additional content assets,
wherein each time a user makes a selection of a content asset to be played back in the content channel, the step of selecting the additional content assets selects more additional content assets for the content channel and makes the content channel endless by continuously adding the more additional contents to the content channel, and
wherein the step of selecting the additional content assets further includes using unavailable content assets as seeds to seek a plurality of additional content assets for the user, an unavailable content asset representing one that is unavailable to the user due to a rating of the content exceeding a permitted rating for the user.

18. The content channel claimed in claim 17, further comprising:
providing content assets to a user device based on user input.

19. The content channel claimed in claim 17, further comprising:
navigating the first content list of the selected one or more content assets based on user input.

20. The content channel as claimed in claim 17, further comprising:
utilizing content assets that have been accessed by a user to generate additional seeds.

21. The content channel as claimed in claim 20, further comprising:
assigning a weight to one or more content assets based on user feedback; and
utilizing the weight in the selecting step.

22. The content channel as claimed in claim 17, further comprising:
generating one or more search criteria based on user input; and
utilizing the search criteria in the seed generating step.

23. The content channel as claimed in claim 17, further comprising:
utilizing a results list for a search as a list of content assets to seed a second content channel.

24. The content channel as claimed in claim 17, wherein the selecting step further comprises:
identifying one or more related content assets based on seeds from a second content channel.

25. The content channel as claimed in claim 17, further comprising:
establishing the content channel as being a restricted content channel;
providing content assets of the restricted content channel; and
controlling modification of the seeds of the restricted content channel.

26. The content channel as claimed in claim 17, further comprising:
replicating the content channel; and
modifying the replicated content channel.

27. The content channel as claimed in claim 17, further comprising:
  replicating the content channel; and
  sharing the replicated content channel with other users.

28. The content channel as claimed in claim 17, further comprising:
  utilizing user feedback of selected content assets to generate additional seeds.

29. The content channel as claimed in claim 28, further comprising:
  generating one or more other content channels based on the additional seeds.

30. The content channel as claimed in claim 28, further comprising:
  generating one or more recommendations based on the additional seeds;
  selecting recommended content assets based on the one or more recommendations;
  receiving additional user feedback of the recommended content assets; and
  modifying the recommendations based on the additional user feedback.

31. A method of creating a content channel comprising:
  generating one or more seeds based on predetermined criteria;
  selecting one or more content assets, from a pool of content assets having at least characteristics of content assets of content channels which have been accessed previously, based on the content assets of the pool and the one or more seeds and generating a first content list for the content channel including information of the one or more content assets;
  generating a history list for the content channel that includes content assets that have been accessed by the user, selectively excluding content assets in the history list from the selecting step according to a repetition criteria, and randomizing a sequence of content assets in the history list when that sequence of content assets is available again to be selected in the first content list,
  presenting the first content list of the selected one or more content assets to a user, wherein the content channel has a plurality of content lists, each content list being assigned a weight indicating an influence of that content list on a selection of content assets for the content channel;
  associating one or more codes with the content channel indicating the predetermined criteria;
  selecting additional content assets based on user input after presentation of the content assets;
  assigning a black-out period to a specific content based on a selection of the user, wherein the black-out period prevents the specific content from being played to the user during a pre-determined period of time; and
  updating the content channel based on the selected additional content assets,
  wherein each time a user makes a selection of a content asset to be played back in the content channel, the step of selecting the additional content assets selects more additional content assets for the content channel and makes the content channel endless by continuously adding the more additional contents to the content channel, and
  wherein the step of selecting the additional content assets further includes using unavailable content assets as seeds to seek a plurality of additional content assets for the user, an unavailable content asset representing one that is unavailable to the user due to a rating of the content exceeding a permitted rating for the user.

32. The method as claimed in claim 31, wherein the codes are not available to the user.

* * * * *